(12) United States Patent
Meardi et al.

(10) Patent No.: US 12,273,544 B2
(45) Date of Patent: Apr. 8, 2025

(54) RATE CONTROL FOR A VIDEO ENCODER

(71) Applicant: V-NOVA INTERNATIONAL LIMITED, London (GB)

(72) Inventors: Guido Meardi, London (GB); Lorenzo Ciccarelli, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 0 days.

(21) Appl. No.: 17/440,585

(22) PCT Filed: Dec. 13, 2019

(86) PCT No.: PCT/GB2019/053551
§ 371 (c)(1),
(2) Date: Sep. 17, 2021

(87) PCT Pub. No.: WO2020/188230
PCT Pub. Date: Sep. 24, 2020

(65) Prior Publication Data
US 2022/0191509 A1    Jun. 16, 2022

(30) Foreign Application Priority Data

Mar. 20, 2019 (GB) .................................. 1903844
Mar. 23, 2019 (GB) .................................. 1904014
(Continued)

(51) Int. Cl.
*H04N 19/33* (2014.01)
*H04N 19/105* (2014.01)
(Continued)

(52) U.S. Cl.
CPC ........... *H04N 19/33* (2014.11); *H04N 19/105* (2014.11); *H04N 19/117* (2014.11);
(Continued)

(58) Field of Classification Search
CPC .. H04N 19/105; H04N 19/117; H04N 19/124; H04N 19/136; H04N 19/14;
(Continued)

(56) References Cited

U.S. PATENT DOCUMENTS

| | | | |
|---|---|---|---|
| 5,734,677 A | * | 3/1998 | Liew .................... H04N 19/147 375/E7.176 |
| 8,964,854 B2 | | 2/2015 | Tu et al. |

(Continued)

FOREIGN PATENT DOCUMENTS

| | | |
|---|---|---|
| CN | 101366283 A | 2/2009 |
| CN | 101878649 A | 11/2010 |

(Continued)

OTHER PUBLICATIONS

S. Sanz-Rodriguez and F. Diaz-de-Maria, "In-Layer Multibuffer Framework for Rate-Controlled Scalable Video Coding," in IEEE Transactions on Circuits and Systems for Video Technology, vol. 22, No. 8, pp. 1199-1212, Aug. 2012, (Rodriguez).*

(Continued)

*Primary Examiner* — Mohammed S Rahaman
(74) *Attorney, Agent, or Firm* — Workman Nydegger

(57) ABSTRACT

A method of encoding an input video as a hybrid video stream, the method comprising: receiving the input video at a first resolution; obtaining an indication of a desired quality level for the encoding, the desired quality level setting one or more bit rates for the hybrid video stream, said hybrid stream comprising a base encoded stream at a second resolution and a plurality of enhancement streams at each of the first and second resolutions, the first resolution being higher than the second resolution; encoding each of the plurality of enhancement streams by: generating a set of residuals based on a difference between the input video and a reconstructed video at the respective resolution of the
(Continued)

enhancement stream; determining quantisation parameters for the set of residuals for based on the desired quality level; quantising the set of residuals based on the quantisation parameters; and creating an encoded stream from the set of quantised residuals.

19 Claims, 11 Drawing Sheets

(30) Foreign Application Priority Data

| | | | |
|---|---|---|---|
| Mar. 29, 2019 | (GB) | ................................... | 1904492 |
| Apr. 15, 2019 | (GB) | ................................... | 1905325 |
| Jul. 5, 2019 | (GB) | ................................... | 1909701 |

(51) Int. Cl.

| | |
|---|---|
| *H04N 19/117* | (2014.01) |
| *H04N 19/124* | (2014.01) |
| *H04N 19/136* | (2014.01) |
| *H04N 19/14* | (2014.01) |
| *H04N 19/152* | (2014.01) |
| *H04N 19/156* | (2014.01) |
| *H04N 19/157* | (2014.01) |
| *H04N 19/172* | (2014.01) |
| *H04N 19/184* | (2014.01) |
| *H04N 19/30* | (2014.01) |
| *H04N 19/31* | (2014.01) |
| *H04N 19/46* | (2014.01) |
| *H04N 19/60* | (2014.01) |
| *H04N 19/80* | (2014.01) |

(52) U.S. Cl.
CPC ......... *H04N 19/124* (2014.11); *H04N 19/136* (2014.11); *H04N 19/14* (2014.11); *H04N 19/152* (2014.11); *H04N 19/156* (2014.11); *H04N 19/157* (2014.11); *H04N 19/172* (2014.11); *H04N 19/184* (2014.11); *H04N 19/30* (2014.11); *H04N 19/31* (2014.11); *H04N 19/46* (2014.11); *H04N 19/60* (2014.11); *H04N 19/80* (2014.11)

(58) Field of Classification Search
CPC .... H04N 19/15; H04N 19/152; H04N 19/154; H04N 19/156; H04N 19/157; H04N 19/172; H04N 19/184; H04N 19/186; H04N 19/187; H04N 19/30; H04N 19/31; H04N 19/33; H04N 19/36; H04N 19/46; H04N 19/60; H04N 19/80
See application file for complete search history.

(56) References Cited

U.S. PATENT DOCUMENTS

| | | |
|---|---|---|
| 2003/0067637 A1 | 4/2003 | Hannuksela |
| 2004/0042549 A1 | 3/2004 | Huang et al. |
| 2007/0160133 A1 | 7/2007 | Bao et al. |
| 2009/0141809 A1 | 6/2009 | Visharam et al. |
| 2011/0261888 A1 | 10/2011 | Cammas et al. |
| 2012/0183076 A1 | 7/2012 | Boyce |
| 2012/0201301 A1 | 8/2012 | Bao et al. |
| 2013/0028328 A1* | 1/2013 | Shiodera ................ H04N 19/52 375/E7.123 |
| 2013/0044813 A1 | 2/2013 | Boon |
| 2013/0272406 A1 | 10/2013 | Yu |
| 2013/0322524 A1* | 12/2013 | Jang ..................... H04N 19/167 375/240.03 |
| 2014/0064386 A1 | 3/2014 | Chen et al. |
| 2014/0219346 A1 | 8/2014 | Ugur |
| 2015/0281709 A1 | 10/2015 | Bracha et al. |
| 2017/0127085 A1 | 5/2017 | Sun et al. |

FOREIGN PATENT DOCUMENTS

| | | |
|---|---|---|
| EP | 2090108 | 6/2013 |
| JP | H11289542 | 10/1999 |
| JP | 2009-523395 A | 6/2009 |
| JP | 2012-114928 A | 6/2012 |
| JP | 2012-213190 A | 11/2012 |
| JP | 2013-251903 A | 12/2013 |
| JP | 2014132759 | 7/2014 |
| JP | 2015-167267 A | 9/2015 |
| JP | 2018-110412 A | 7/2018 |
| KR | 10-1005682 B1 | 1/2011 |
| WO | WO 2007/082288 A1 | 7/2007 |
| WO | 2011-084918 | 7/2011 |
| WO | 2013/171173 A1 | 11/2013 |
| WO | WO 2014/007131 A1 | 1/2014 |
| WO | 2017-089839 | 6/2017 |
| WO | 2017/149327 A1 | 9/2017 |

OTHER PUBLICATIONS

Y. Liu, Y. C. Soh and Z. G. Li, "Rate Control for Spatial/CGS Scalable Extension of H.264/AVC," 2007 IEEE International Symposium on Circuits and Systems, New Orleans, LA, USA, 2007, pp. 1746-1750 (describes use of buffer status in QP adjustment for scalable coding).*
International Search Report and Written Opinion for PCT/GB2019/053551 mailed Mar. 4, 2020.
Yang Liu_Rate Control of H.264/AVC Scalable Extension, 2006 IEEE; (8 pages).
GB2312647.7 Search and Examination Report dated Sep. 7, 2023.
GB2312674.1 Search and Examination Report dated Oct. 10, 2023.
GB2312680.8 Search Report dated Oct. 5, 2023.
International Preliminary Report on Patentability received for PCT Patent Application No. PCT/GB2019/053551, mailed on Sep. 30, 2021, 9 pages.
Search & Examination for GB2312636.0 dated Sep. 28, 2023.
JP 2021-556458 Office Action dated Nov. 24, 2023.
Liu, et.al., "Rate Control of H. 264/AVC Scalable Extension," IEEE Transactions on Circuits and Systems for Video Technology, vol. 18, Issue 1, Jan. 2008, pp. 116-121.
GB2312670.9 Search & Exam report dated Sep. 12, 2023.
GB2312675.8 Search & Exam report dated Sep. 12, 2023.
Office Action received for Canada Patent Application No. 3133777, mailed on Mar. 12, 2024, 5 pages.
Office Action received for Chinese Patent Application No. 201980095810.0 , mailed on May 30, 2023, 12 pages.
Office Action received for GB Patent Application No. 2114840.8, mailed on Feb. 28, 2023, 4 pages.
Office Action received for Chinese Patent Application No. 201980095810.0, mailed on Oct. 16, 2023, 9 pages of English Translation.

* cited by examiner

RATE CONTROL FOR A VIDEO ENCODER

CROSS-REFERENCE TO RELATED APPLICATIONS

The present application is a 371 US Nationalization of International Patent Application No. PCT/GB2019/053551, filed Dec. 13, 2019, which claims priority to UK Patent Application Nos. 1903844.7, filed Mar. 20, 2019, 1904014.6, filed Mar. 23, 2019, 1904492.4, filed Mar. 29, 2019, 1905325.5, filed Apr. 15, 2019, and 1909701.3, filed Jul. 5, 2019, the entire disclosures of which are incorporated herein by reference.

TECHNICAL FIELD

This disclosure relates to a method and apparatus for encoding a signal. In particular, but not exclusively, this disclosure relates to a method and apparatus for encoding video and/or image signals. The disclosure relates to a rate control methodology and apparatus for rate control during the encoding process.

BACKGROUND

When encoding data, for example video data, it is known to set the number of bits required to encode a portion of the data. In the case of video data, this may be the number of bits to encode a frame of video data. The setting of the number of bits required is known as rate control. It is known to set the bit rate at a constant, or variable value.

A known form of rate control uses a "Constant Rate Factor", or CRF, where the data rate is adjusted to achieve, or maintain, a desired quality of the encoding. Therefore, in video encoding, the bit rate may increase or decrease depending on the complexity of the scene to be encoded. A more complex scene will require more data to encode a given level of quality than a less complex scene at the same level of quality. Thus CRF will maintain a constant level of quality when encoding, compared to maintaining a constant bitrate as is found in constant bitrate encoding. The terms level of quality and quality level are used interchangeably.

SUMMARY

There are provided methods, computer programs, computer-readable mediums, and an encoder as set out in the appended claims.

In an embodiment there is provided a method of encoding an input video as a hybrid video stream, the method comprising: receiving the input video at a first resolution; obtaining an indication of a desired quality level for the encoding, the desired quality level setting one or more bit rates for the hybrid video stream, said hybrid stream comprising a base encoded stream at a second resolution and a plurality of enhancement streams at each of the first and second resolutions, the first resolution being higher than the second resolution; encoding each of the plurality of enhancement streams by: generating a set of residuals based on a difference between the input video and a reconstructed video at the respective resolution of the enhancement stream; determining quantisation parameters for the set of residuals for based on the desired quality level; quantising the set of residuals based on the quantisation parameters; and creating an encoded stream from the set of quantised residuals.

The method allows for the rate control to be set according to a desired quality rate, or bit rate. As the method is used for hybrid streams the method allows for the quantisation of two different enhancement streams to be set.

Other aspects of the invention will be apparent from the appended claim set.

BRIEF DESCRIPTION OF THE DRAWINGS

One or more examples will now be described with reference to the accompanying drawings, in which.

DETAILED DESCRIPTION OF THE EMBODIMENT(S)

Figure 1:
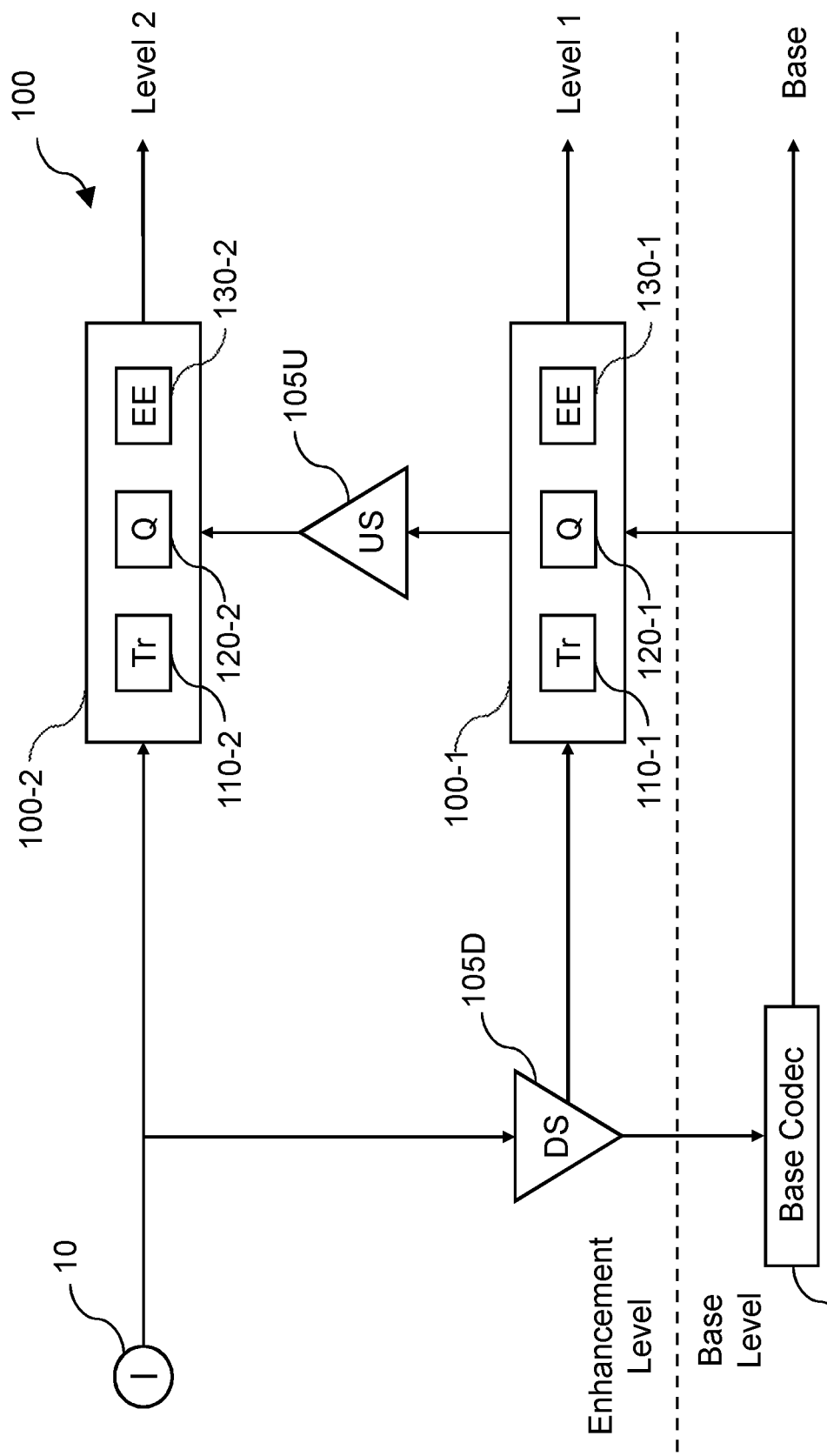
FIG. 1 shows a block diagram of an example encoder at a first level of detail.

This disclosure describes a hybrid backward-compatible coding technology. This technology is a flexible, adaptable, highly efficient and computationally inexpensive coding format which combines a different video coding format, a base codec (i.e. encoder-decoder), (e.g. AVC/H.264, HEVC/H.265, or any other present or future codec, as well as non-standard algorithms such as VP9, AV1 and others) with at least two enhancement levels of coded data.

The general structure of the encoding scheme uses a down-sampled source signal encoded with a base codec, adds a first level of correction or enhancement data to the decoded output of the base codec to generate a corrected picture, and then adds a further level of correction or enhancement data to an up-sampled version of the corrected picture.

Thus, certain examples described herein act to encode a signal into a set of data streams, i.e. data that changes over time. Certain examples relate to an encoder or encoding process that generates a set of streams including a base stream and one or more enhancement streams, where there are typically two enhancement streams. It is worth noting that the base stream may be decodable by a hardware decoder while the enhancement stream(s) may be suitable for a software processing implementation with suitable power consumption.

Certain examples provide an encoding structure that creates a plurality of degrees of freedom that allow great flexibility and adaptability in many situations, thus making the coding format suitable for many use cases including over-the-top (OTT) transmission, live streaming, live UHD broadcast, and so on. It also provides for low complexity video coding.

Typically, the set of streams, which may be referred to herein as a hybrid stream, is decoded and combined to generate an output signal for viewing. This may comprise an output reconstructed video signal at a same resolution as an original input video signal. Although the decoded output of the base codec is not intended for viewing, it is a fully decoded video at a lower resolution, making the output compatible with existing decoders and, where considered suitable, also usable as a lower resolution output. The base stream and the first enhancement stream may further be decoded and combined for viewing as a corrected lower resolution video stream.

The example video coding technology described herein uses a minimum number of relatively simple coding tools. When combined synergistically, they can provide visual quality improvements when compared with a full resolution picture encoded with the base codec whilst at the same time generating flexibility in the way they can be used.

The methods and apparatuses are based on an overall approach which is built over an existing encoding and/or decoding algorithm (e.g. MPEG standards such as AVC/H.264, HEVC/H.265, etc. as well as non-standard algorithms such as VP9, AV1, and others) which works as a baseline for an enhancement layer. The enhancement layer works accordingly to a different encoding and/or decoding approach. The idea behind the overall approach is to encode/decode hierarchically the video frame as opposed to using block-based approaches as done in the MPEG family of algorithms. Hierarchically encoding a frame includes generating residuals for the full frame, and then a reduced or decimated frame and so on.

An example encoding process is depicted in the block diagram of FIG. 1. An input full resolution video is processed to generate various encoded streams. A base encoded stream is produced by feeding a base codec (e.g., AVC, HEVC, or any other codec) with a down-sampled version of the input video. The base encoded stream may comprise the output of a base encoder of the base codec. A first encoded stream for an enhancement layer (encoded level 1 stream) is produced by processing the residuals obtained by taking the difference between the reconstructed base codec video and the down-sampled version of the input video. Reconstructing the encoded base stream may comprise receiving a decoded base stream from the base codec. A second encoded stream for the enhancement layer (encoded level 2 stream) is produced by processing the residuals obtained by taking the difference between an up-sampled version of a corrected version of the reconstructed base coded video and the input video.

In certain cases, the components of FIG. 1 may provide a general low complexity encoder. In certain cases, the enhancement streams may be generated by encoding processes that form part of the low complexity encoder and the low complexity encoder may be configured to control an independent base encoder and decoder (e.g. as packaged as a base codec). In other cases, the base encoder and decoder may be supplied as part of the low complexity encoder. In one case, the low complexity encoder of FIG. 1 may be seen as a form of wrapper for the base codec, where the functionality of the base codec may be hidden from an entity implementing the low complexity encoder.

Figure 2:
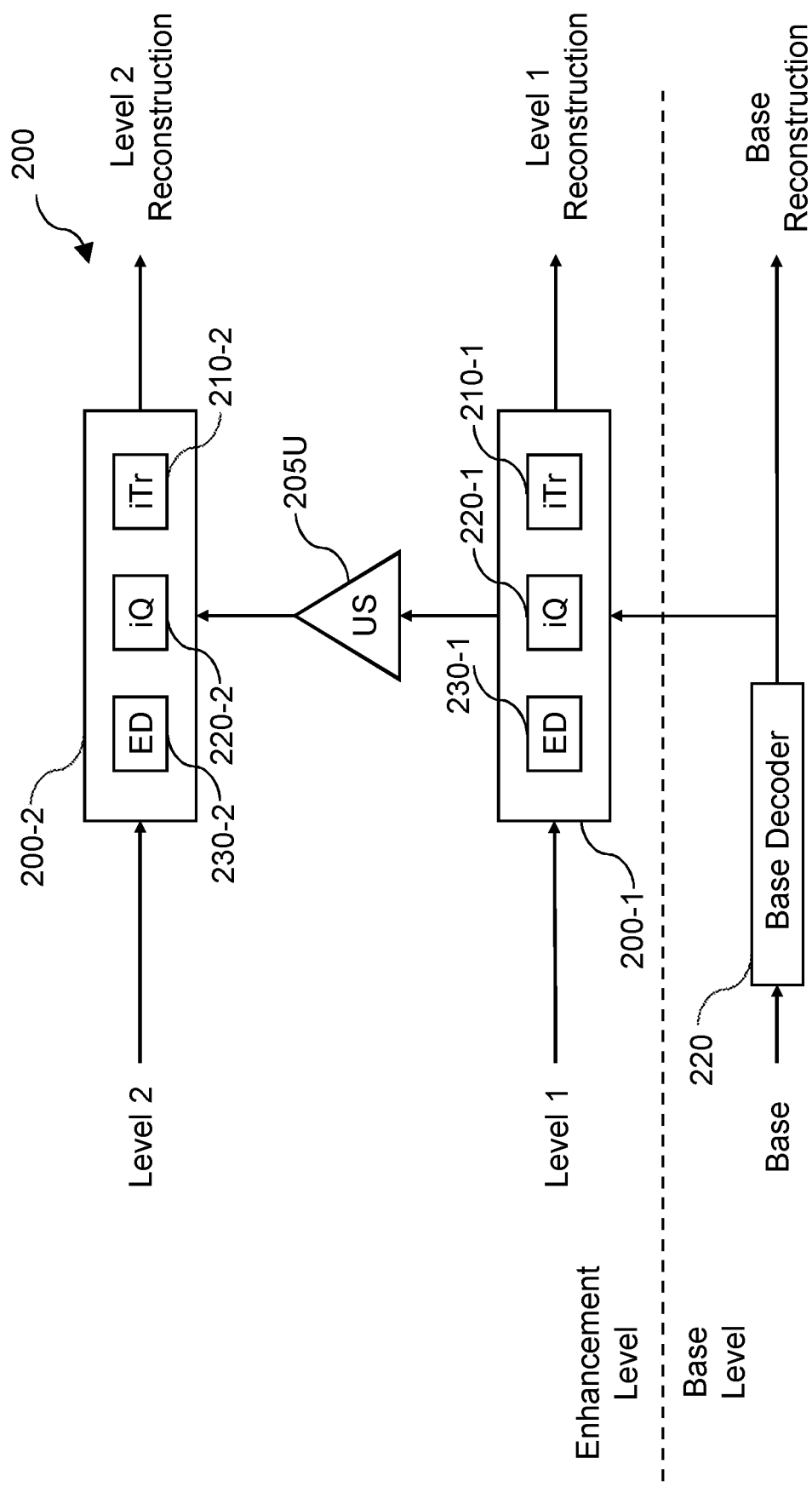
FIG. 2 shows a block diagram of an example decoder at a first level of detail.

An example decoding process is depicted in the block diagram of FIG. 2. The decoding process may be a complementary process to the example encoding process of FIG. 1. The decoder receives the three streams generated by the encoder together with headers containing further decoding information. The encoded base stream is decoded by a base decoder corresponding to the base codec used in the encoder, and its output is combined with the decoded residuals obtained from the encoded level 1 stream. The combined video is up-sampled and further combined with the decoded residuals obtained from the encoded level 2 stream.

Turning to FIG. 1 an example encoder topology at a general level is as follows. The encoder 100 comprises an input I for receiving an input signal 10. The input signal 10 may comprise a full (or highest) resolution video, where the encoder is applied on a frame-by-frame basis. The input I is connected to a down-sampler 105D and processing block 100-2. The down-sampler 105D outputs to a base codec 120 at the base level of the encoder 100. The down-sampler 105D also outputs to processing block 100-1. Processing block 100-1 passes an output to an up-sampler 105U, which in turn outputs to the processing block 100-2. Each of the processing blocks 100-2 and 100-1 comprise one or more of the following modules: a transform block 110, a quantisation block 120 and an entropy encoding block 130.

The base stream is substantially created by a process as noted above. That is, an input video is down-sampled (i.e. a down-sampling operation is applied to the input video to generate a down-sampled input video. The down-sampled video is then encoded using a first base codec (i.e. an encoding operation is applied to the down-sampled input video to generate an encoded base stream using a first or base codec). Preferably the first or base codec is a codec suitable for hardware decoding. The encoded base stream may be referred to as the base layer or base level.

Figure 3:
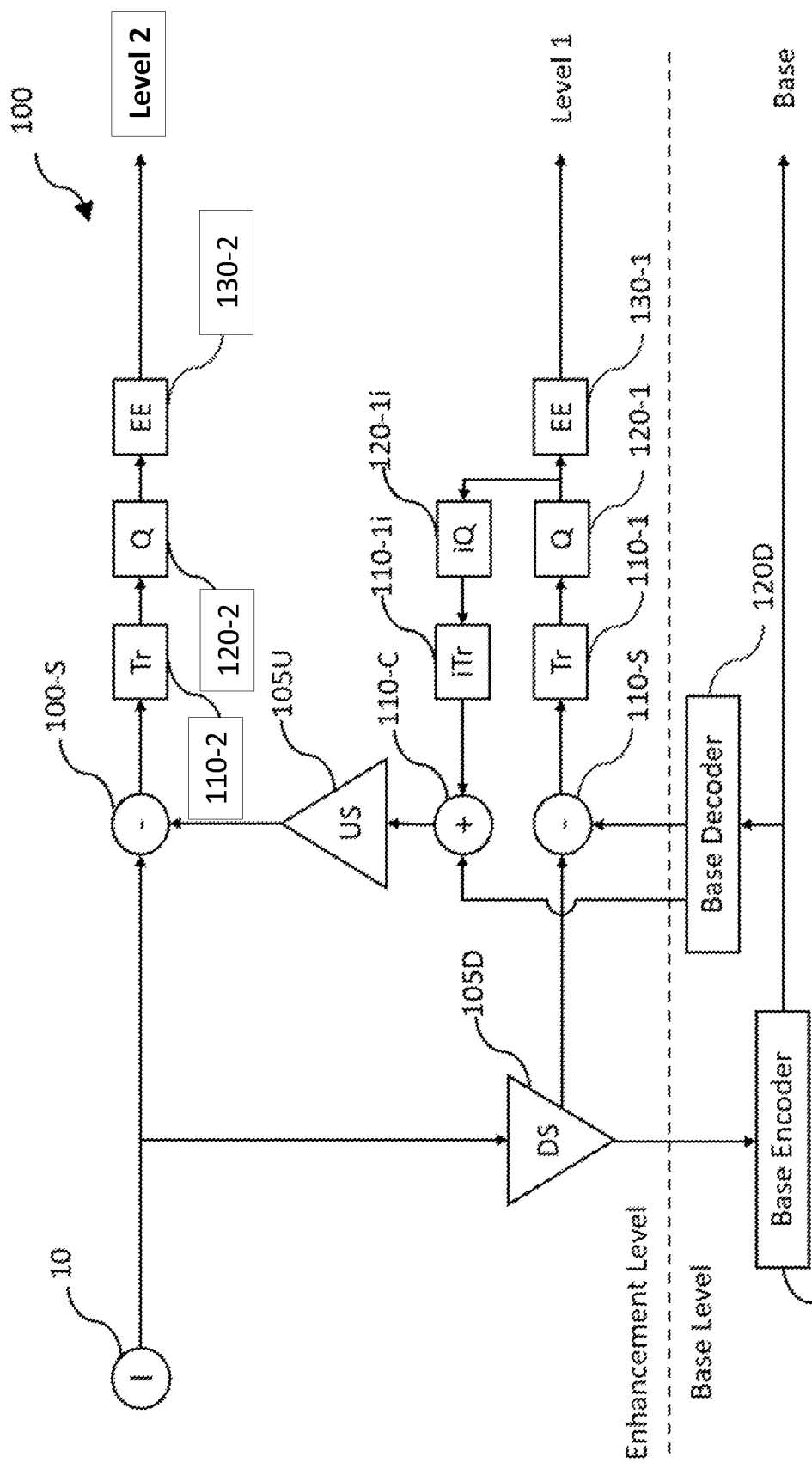
FIG. 3 shows a block diagram of an example encoder at a second level of detail.

As noted above, the enhancement stream may comprise two streams. A first level of enhancement provides for a set of correction data which can be combined with a decoded version of the base stream to generate a corrected picture. This first enhancement stream is illustrated in FIGS. 1 and 3 as the encoded level 1 stream.

To generate the encoded level 1 stream, the encoded base stream is decoded (i.e. a decoding operation is applied to the encoded base stream to generate a decoded base stream). The difference between the decoded base stream and the down-sampled input video is then created (i.e. a subtraction operation is applied to the down-sampled input video and the decoded base stream to generate a first set of residuals). Here the term residuals is used in the same manner as that known in the art, that is, the error between a reference frame and a reconstructed frame. Here the reconstructed frame is the decoded base stream and the reference frame is the down-sampled input video. Thus the residuals used in the first enhancement level can be considered as a corrected video as they 'correct' the decoded base stream to the down-sampled input video that was used in the base encoding operation. The first set of residuals is then encoded using the first encoding block 100-1 (which may also be referred to as a first encoder or a first enhancement encoder) to generate the encoded level 1 stream (i.e. an encoding operation is applied to the first set of residuals to generate a first enhancement stream).

FIG. 2 is a block diagram of the decoding process, which may correspond to the encoding process shown in FIG. 1. The decoding process is split into two halves as shown by the dashed line. Below the dashed line is the base level of a decoder 200. The base level may usefully be implemented in hardware. Above the dashed line is the enhancement level, which may usefully be implemented in software. The decoder 200 may comprise only the enhancement level processes, or a combination of the base level processes and enhancement level processes as needed. The decoder 200 may usefully be implemented in software, especially at the enhancement level, and may suitably sit over legacy decoding technology, particularly legacy hardware technology. By legacy technology, it is meant older technology previously developed and sold which is already in the marketplace, and which would be inconvenient and/or expensive to replace, and which may still serve a purpose for decoding signals. In other cases, the base level may comprise any existing and/or future video encoding tool or technology.

The decoder topology at a general level is as follows. The decoder 200 comprises an input (not shown) for receiving one or more input signals comprising the encoded base stream, the encoded level 1 stream, and the encoded level 2 stream together with optional headers containing further decoding information (such as local and global configuration information). The decoder 200 comprises a base decoder 220 at the base level, and processing blocks 200-1 and 200-2 at the enhancement level. The base decoder 220 may form part of an applied base codec (e.g. a decoding function or unit of a base codec). An up-sampler 205U is also provided between the processing blocks 200-1 and 200-2 to provide processing block 200-2 with an up-sampled version of a signal output by processing block 200-1.

The decoder 200 receives the one or more input signals and directs the three streams generated by the encoder 100. The encoded base stream is directed to and decoded by the base decoder 220, which corresponds to the base codec 120 used in the encoder 100, and which acts to reverse the encoding process at the base level. The encoded level 1 stream is processed by block 200-1 of decoder 200 to recreate the first residuals created by encoder 100. Block 200-1 corresponds to the processing block 100-1 in encoder 100, and at a basic level acts to reverse or substantially reverse the processing of block 100-1. The output of the base decoder 220 is combined with the first residuals obtained from the encoded level 1 stream. The combined signal is up-sampled by up-sampler 205U. The encoded level 2 stream is processed by block 200-2 to recreate the further residuals created by the encoder 100. Block 200-2 corresponds to the processing block 100-2 of the encoder 100, and at a basic level acts to reverse or substantially reverse the processing of block 100-2. The up-sampled signal from up-sampler 205U is combined with the further residuals obtained from the encoded level 2 stream to create a level 2 reconstruction of the input signal 10. The level 2 reconstruction of the input signal 10 may be used as decoded video at the same resolution as the original input video. The encoding and decoding described herein may generate a lossy or lossless reconstruction of the original input signal 10 depending on the configuration of the encoder and decoder. In many cases, the level 2 reconstruction of the input signal 10 may be a lossy reconstruction of an original input video where the losses have a reduced or minimal effect on the perception of the decoded video.

As noted above, the enhancement stream may comprise two streams, namely the encoded level 1 stream (a first level of enhancement) and the encoded level 2 stream (a second level of enhancement). The encoded level 1 stream provides a set of correction data which can be combined with a decoded version of the base stream to generate a corrected picture. The encoded level 2 stream provides a set of correction or enhancement data that adds fine detail to the corrected picture generated by combining the decoded level 1 stream and the decoded base stream.

FIG. 3 shows the encoding process of FIG. 1 in further detail. The encoded base stream is created directly by the base encoder 120E, and may be quantised and entropy encoded as necessary. In certain cases, these latter processes may be performed as part of the encoding by the base encoder 120E. To generate the encoded level 1 stream, the encoded base stream is decoded at the encoder 100 (i.e. a decoding operation is applied at base decoding block 120D to the encoded base stream). The base decoding block 120D is shown as part of the base level of the encoder 100 and is shown separate from the corresponding base encoding block 120E. For example, the base decoder 120D may be a decoding component that complements an encoding component in the form of the base encoder 120E with a base codec. In other examples, the base decoding block 120D may instead be part of the enhancement level and in particular may be part of processing block 100-1.

Returning to FIG. 3, a difference between the decoded base stream output from the base decoding block 120D and the down-sampled input video is created (i.e. a subtraction operation 110-S is applied to the down-sampled input video and the decoded base stream to generate a first set of residuals). Here the term residuals is used in the same manner as that known in the art; that is, residuals represent the error or differences between a reference signal or frame and a reconstructed signal or frame. Here the reconstructed signal or frame is the decoded base stream and the reference signal or frame is the down-sampled input video. Thus the residuals used in the first enhancement level can be considered as a correction signal as they are able to 'correct' a future decoded base stream to be the or a closer approximation of the down-sampled input video that was used in the base encoding operation. This is useful as this can correct for quirks or other peculiarities of the base codec. These include, amongst others, motion compensation algorithms applied by the base codec, quantisation and entropy encoding applied by the base codec, and block adjustments applied by the base codec.

The components of block 100-1 in FIG. 1 are shown in more detail in FIG. 3. In particular, the first set of residuals are transformed, quantised and entropy encoded to produce the encoded level 1 stream. In FIG. 3, a transform operation 110-1 is applied to the first set of residuals; a quantisation operation 120-1 is applied to the transformed set of residuals to generate a set of quantised residuals; and, an entropy encoding operation 130-1 is applied to the quantised set of residuals to generate the encoded level 1 stream at the first level of enhancement. However, it should be noted that in other examples only the quantisation step 120-1 may be performed, or only the transform step 110-1. Entropy encoding may not be used, or may optionally be used in addition to one or both of the transform step 110-1 and quantisation step 120-1. The entropy encoding operation can be any suitable type of entropy encoding, such as a Huffmann encoding operation or a run-length encoding (RLE) operation, or a combination of both a Huffmann encoding operation and a RLE operation.

As noted above, the enhancement stream may comprise the encoded level 1 stream (the first level of enhancement) and the encoded level 2 stream (the second level of enhancement). The first level of enhancement may be considered to enable a corrected video at a base level, that is, for example to correct for encoder quirks. The second level of enhancement may be considered to be a further level of enhancement that is usable to convert the corrected video to the original input video or a close approximation thereto. For example, the second level of enhancement may add fine detail that is lost during the downsampling and/or help correct from errors that are introduced by one or more of the transform operation 110-1 and the quantisation operation 120-1.

It should be noted that the components shown in FIGS. 1 and 3 may operate on blocks or coding units of data, e.g. corresponding to 2×2 or 4×4 portions of a frame at a particular level of resolution. The components operate without any inter-block dependencies, hence they may be applied in parallel to multiple blocks or coding units within a frame. This differs from comparative video encoding schemes wherein there are dependencies between blocks (e.g. either spatial dependencies or temporal dependencies). The dependencies of comparative video encoding schemes limit the level of parallelism and require a much higher complexity.

Preferably the transform operation 110-1 is a directional decomposition transform such as a Hadamard-based transform. Generally, the transform may be applied using a transformation matrix that is applied to a flattened (i.e. one dimension array) block of residual elements (e.g. corresponding to a block of picture elements such as a colour component channel in the input signal). As above, these blocks may also be referred to as coding units, as they are the basic unit at which the encoder and decoder processes are applied. For a 2×2 coding unit a 4×4 Hadamard matrix may be applied and for a 4×4 coding unit a 16×16 Hadamard matrix may be applied. These two forms of transform may be referred to as a directional decomposition (DD) transform and a directional decomposition squared (DDS) transform. The latter transform is so-called as it may be seen as a repeated application of the directional decomposition transform. Both have a small kernel which is applied directly to the residuals.

As an example, a first transform has a 4×4 kernel which is applied to a flattened 2×2 block of residuals (R). The resulting coefficients (C) may be determined as follows:

$$\begin{pmatrix} C_{00} \\ C_{01} \\ C_{10} \\ C_{11} \end{pmatrix} = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} R_{00} \\ R_{01} \\ R_{10} \\ R_{11} \end{pmatrix}$$

Following this, a second transform has a 16×16 kernel which is applied to a 4×4 block of residuals. The resulting coefficients are as follows:

$$\begin{pmatrix} C_{00} \\ C_{01} \\ C_{02} \\ C_{03} \\ C_{10} \\ C_{11} \\ C_{12} \\ C_{13} \\ C_{20} \\ C_{21} \\ C_{22} \\ C_{23} \\ C_{30} \\ C_{31} \\ C_{32} \\ C_{33} \end{pmatrix} = \begin{pmatrix} 1 & 1 & 1 & 1 & 1 & 1 & 1 & 1 & 1 & 1 & 1 & 1 & 1 & 1 & 1 & 1 \\ 1 & 1 & -1 & -1 & 1 & 1 & -1 & -1 & 1 & 1 & -1 & -1 & 1 & 1 & -1 & -1 \\ 1 & -1 & 1 & -1 & 1 & -1 & 1 & -1 & 1 & -1 & 1 & -1 & 1 & -1 & 1 & -1 \\ 1 & -1 & -1 & 1 & 1 & -1 & -1 & 1 & 1 & -1 & -1 & 1 & 1 & -1 & -1 & 1 \\ 1 & 1 & 1 & 1 & 1 & 1 & 1 & 1 & -1 & -1 & -1 & -1 & -1 & -1 & -1 & -1 \\ 1 & 1 & -1 & -1 & 1 & 1 & -1 & -1 & -1 & -1 & 1 & 1 & -1 & -1 & 1 & 1 \\ 1 & -1 & 1 & -1 & 1 & -1 & 1 & -1 & -1 & 1 & -1 & 1 & -1 & 1 & -1 & 1 \\ 1 & -1 & -1 & 1 & 1 & -1 & -1 & 1 & -1 & 1 & 1 & -1 & -1 & 1 & 1 & -1 \\ 1 & 1 & 1 & 1 & -1 & -1 & -1 & -1 & 1 & 1 & 1 & 1 & -1 & -1 & -1 & -1 \\ 1 & 1 & -1 & -1 & -1 & -1 & 1 & 1 & 1 & 1 & -1 & -1 & -1 & -1 & 1 & 1 \\ 1 & -1 & 1 & -1 & -1 & 1 & -1 & 1 & 1 & -1 & 1 & -1 & -1 & 1 & -1 & 1 \\ 1 & -1 & -1 & 1 & -1 & 1 & 1 & -1 & 1 & -1 & -1 & 1 & -1 & 1 & 1 & -1 \\ 1 & 1 & 1 & 1 & -1 & -1 & -1 & -1 & -1 & -1 & -1 & -1 & 1 & 1 & 1 & 1 \\ 1 & 1 & -1 & -1 & -1 & -1 & 1 & 1 & -1 & -1 & 1 & 1 & 1 & 1 & -1 & -1 \\ 1 & -1 & 1 & -1 & -1 & 1 & -1 & 1 & -1 & 1 & -1 & 1 & 1 & -1 & 1 & -1 \\ 1 & -1 & -1 & 1 & -1 & 1 & 1 & -1 & -1 & 1 & 1 & -1 & 1 & -1 & -1 & 1 \end{pmatrix} \begin{pmatrix} R_{00} \\ R_{01} \\ R_{02} \\ R_{03} \\ R_{10} \\ R_{11} \\ R_{12} \\ R_{13} \\ R_{20} \\ R_{21} \\ R_{22} \\ R_{23} \\ R_{30} \\ R_{31} \\ R_{32} \\ R_{33} \end{pmatrix}$$

Preferably the quantisation operation 120-1 is performed using a linear quantiser. The linear quantiser may use a dead zone of variable size. This is described later in more detail with reference to FIGS. 10A and 10B.

In one case, the encoder 100 of FIGS. 1 and 3, and the decoder 200 of FIG. 2, described herein may be applied to so-called planes of data that reflect different colour components of a video signal. For example, the components and methods described herein may be applied to different planes of YUV or RGB data reflecting different colour channels. Different colour channels may be processed in parallel. Hence, references to sets of residuals as described herein may comprise multiple sets of residuals, where each colour component has a different set of residuals that form part of a combined enhancement stream.

Referring to both FIG. 1 and FIG. 3, to generate the encoded level 2 stream, a further level of enhancement information is created by producing and encoding a further set of residuals at block 100-2. The further set of residuals are the difference between an up-sampled version (via up-sampler 105U) of a corrected version of the decoded base stream (the reference signal or frame), and the input signal 10 (the desired signal or frame).

To achieve a reconstruction of the corrected version of the decoded base stream as would be generated at the decoder 200, at least some of the processing steps of block 100-1 are reversed to mimic the processes of the decoder 200, and to account for at least some losses and quirks of the transform and quantisation processes. To this end, block 100-1 comprises an inverse quantise block 120-1*i* and an inverse transform block 110-1*i*. The quantised first set of residuals are inversely quantised at inverse quantise block 120-1*i* and are inversely transformed at inverse transform block 110-1*i* in the encoder 100 to regenerate a decoder-side version of the first set of residuals. Other filtering operations may additionally be performed to reconstruct the input to the upsampler 105U.

The decoded base stream from decoder 120D is combined with the decoder-side version of the first set of residuals (i.e. a summing operation 110-C is performed on the decoded base stream and the decoder-side version of the first set of residuals). Summing operation 110-C generates a reconstruction of the down-sampled version of the input video as would be generated in all likelihood at the decoder—i.e. a reconstructed video at the resolution of level 1). As illustrated in FIG. 1 and FIG. 3, the reconstructed base codec video is then up-sampled by up-sampler 105U.

The up-sampled signal (i.e. reconstructed signal or frame) is then compared to the input signal 10 (i.e. desired or reference signal or frame) to create a second or further set of residuals (i.e. a difference operation 100-S is applied to the up-sampled re-created stream to generate a further set of residuals). The further set of residuals are then processed at block 100-2 to become the encoded level 2 stream (i.e. an encoding operation is then applied to the further set of residuals to generate the encoded further enhancement stream).

In particular, the further set of residuals are transformed (i.e. a transform operation 110-2 is performed on the further set of residuals to generate a further transformed set of residuals). The transformed residuals are then quantised and entropy encoded in the manner described above in relation to the first set of residuals (i.e. a quantisation operation 120-2 is applied to the transformed set of residuals to generate a further set of quantised residuals; and, an entropy encoding operation 130-2 is applied to the quantised further set of residuals to generate the encoded level 2 stream containing the further level of enhancement information). However, only the quantisation step 120-1 may be performed, or only the transform and quantisation step. Entropy encoding may optionally be used in addition. Preferably, the entropy encoding operation may be a Huffmann encoding operation or a run-length encoding (RLE) operation, or both.

Thus, as illustrated in FIGS. 1 and 3 and described above, the output of the encoding process is a base stream at a base level, and one or more enhancement streams at an enhancement level which preferably comprises a first level of enhancement and a further level of enhancement.

FIGS. 1 to 3 show an example encoding and decoding scheme in which certain aspects of the present invention may be applied. One aspect of the invention is the ability to adapt the data rate of the hybrid stream whilst maintaining a desired quality level (e.g. a desired level of quality for an output decoded video). An aspect of the hybrid encoding methodology is that the methodology allows for parallel encoding, and decoding, of the data stream. As the methodology does not rely on inter-block information, whether intra or inter frame, each frame, and indeed individual portions of a frame may be processed separately. For the purpose of rate control, this flexibility allows for different metrics to be set for each enhancement stream, as the different encoding components of each enhancement layer may be controlled independently. This thus provides an improved and simple rate control methodology.

With hybrid streams, such as the set of three streams output by the encoder 100, a desired level of quality for the hybrid stream as a whole, e.g. based on bandwidth restrictions, may be implemented by applying rate control for one or more of the three streams. The rate control may be applied by determining on a desired quality or bit rates for individual streams within a collective bit rate budget. As each enhancement stream represents a resolution of the video data when rendered, controlling the rate control via a quality metric ensures that the hybrid stream can encode and deliver the data at known qualities.

Figure 4:
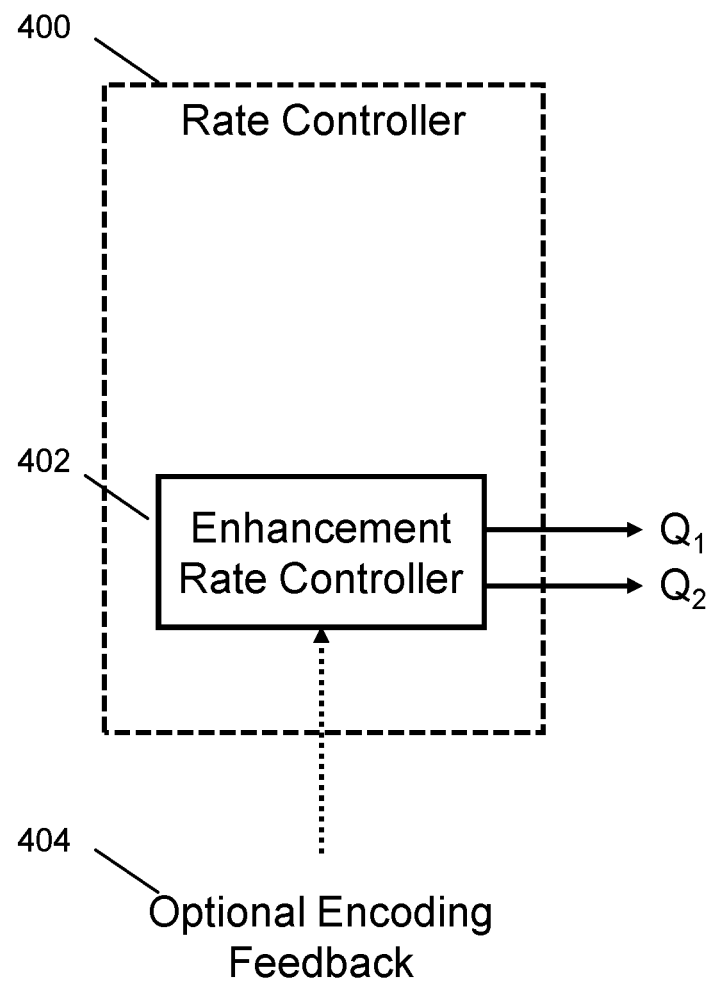
FIG. 4 shows a block diagram of a rate controller according to a first example.

FIG. 4 shows a schematic representation of a first example rate controller 400. The rate controller 400 of this example comprises an enhancement rate controller 402. The enhancement rate controller 402 is configured to control a bit rate of each of the enhancement streams shown in FIGS. 1 to 3 (e.g. the level 1 and level 2 streams) by setting quantisation parameters $Q_i$ for each stream. In FIG. 4, the enhancement rate controller 402 outputs two quantisation parameters: a first quantisation parameter $Q_1$ for the first (level 1) enhancement stream and a second quantisation parameter $Q_2$ for the second (level 2) enhancement stream. It should be noted that in some implementations, the levels of the enhancement streams may be labelled in reverse, such that a highest resolution stream is level 0 and that a lower resolutions stream is level 1.

The example of FIG. 4 shows a rate controller 400 implemented according to a first rate control mode. In this rate control mode, no external desired quality level is supplied. As such, the first and second quantisation parameters $Q_1$ and $Q_2$ may be set based on internal control logic and/or internal measurements for the encoding scheme. The rate controller 400 may also optionally determine a bit rate for the base layer (not shown) or a bit rate for the base layer may be set via a configuration parameter. While only two enhancement streams are shown in FIG. 4, the process described herein may be extended to multiple enhancement streams (e.g. at increasing layers of resolution). In examples described herein a bit rate may be set according to a bit-per-picture element or bpp rate, where the picture element may comprise a residual element (e.g. a "pixel" of a residual signal).

In the example shown in FIG. 4, as described in detail below, the enhancement rate controller 402 determines, for each enhancement level, a level of quantisation that is represented by the quantisation parameters $Q_1$ and $Q_2$. The rate controller 400 forms part of an encoder, such as the encoder 100 of any of FIGS. 1 and 3. The quantisation parameters may also be communicated to a decoder such as the decoder 200 of FIG. 2. The quantisation parameters may form part of header information for the hybrid stream (or one of the enhancement streams). The quantisation parameters $Q_1$ and $Q_2$ may be determined on a frame-by-frame basis, such that for a given frame the quantisation parameters are used to quantise each coding unit within the frame, e.g. as applied by quantisation blocks 120-1 and 120-2. Reference to frame herein may refer to a particular component of a frame, e.g. one of a YUV or RGB component where the set of components are encoded in a similar manner (and may be encoded in parallel). In certain cases, there may be different quantisation parameters $Q_1$ and $Q_2$ for different components and/or common quantisation parameters $Q_1$ and $Q_2$ for each set of components for a given frame (e.g. the quantisation parameters are set for the frame and applied similarly for each component).

As shown in FIG. 4, in certain cases the rate controller 400 may receive optional encoding feedback 604. The encoding feedback 604 may comprise information regarding the encoding process that is useable by the enhancement rate controller 402 to set the quantisation parameters $Q_1$ and $Q_2$. The encoding feedback 604 may comprise feedback from the encoding process as applied to previously-encoded frames. The encoding feedback 604 may enable the enhancement rate controller 602 determine the level of quantisation for each enhancement layer.

As described in detail below, the quantisation parameters $Q_1$ and $Q_2$ may be used by the quantisation blocks 120-1 and 120-2 to determine a bin size (or set of bin sizes) to use in the quantisation process, with a smaller bin size representing a more detailed level of quantisation which requires more data to encode (i.e. more bins means more values to entropy encode and a lower likelihood of runs of zero if run-length encoding is applied). By adjusting the bin size (and therefore the level of quantisation) it is possible to control the quality of the frame being encoded, and also the data rate. Therefore, by varying the quantisation parameters for each of the enhancement streams, the amount of data required to encode each frame of data may be varied. In one case, the enhancement rate controller 402 may be configured to set the quantisation parameters $Q_1$ and $Q_2$ depending on a complexity of a frame, thus reducing a data rate for low complexity scenes and/or allowing adjustment based on changing bandwidth availability.

According to the first rate control mode, as shown by the example of FIG. 4, a desired quality level in the first instance may be a predetermined internal value. The first rate control mode may be applied where there is a static available bit rate for a transmission. In this case, the quantisation parameters $Q_1$ and $Q_2$ may be adjusted during transmission and/or generation of an encoded hybrid stream to maintain the static bit rate. The independence of the two enhancement streams provides good flexibility for controlling the bit rate, e.g. in certain cases a finer level of quantisation for the first enhancement level may allow a coarser level of quantisation at the second enhancement level and so enable bit rate trade off (e.g. as the second enhancement level is typically at a higher resolution and so requires more bits). In further examples described below, a second rate control mode is presented wherein a desired quality level may be set (e.g. by a user, cloud controller or configuration parameter) in order to better manage the data rate.

As described in detail below, in certain cases, the amount of data required to encode each frame may vary, and may vary at each enhancement layer. This may be due to the unpredictable nature of the input video stream, and/or the ability to encode blocks of data independently from other blocks (e.g. also at a frame-by-frame level). To account for variations in the data required to encode each frame of data, it is preferable to set a desired level of quality or quality factor such that a buffer used in the encoding and/or decoding process is not be full, or above capacity for the majority of frames. This ensures that more complex frames, which require more data to encode, may be stored in the buffer. A desired level of quality may also be useful in situations where a variable bandwidth is available, e.g. where a transmission may be allowed to take up a variable proportion of the available bandwidth it may be desired to work to a given level of quality to avoid using too much bandwidth.

Figure 5:
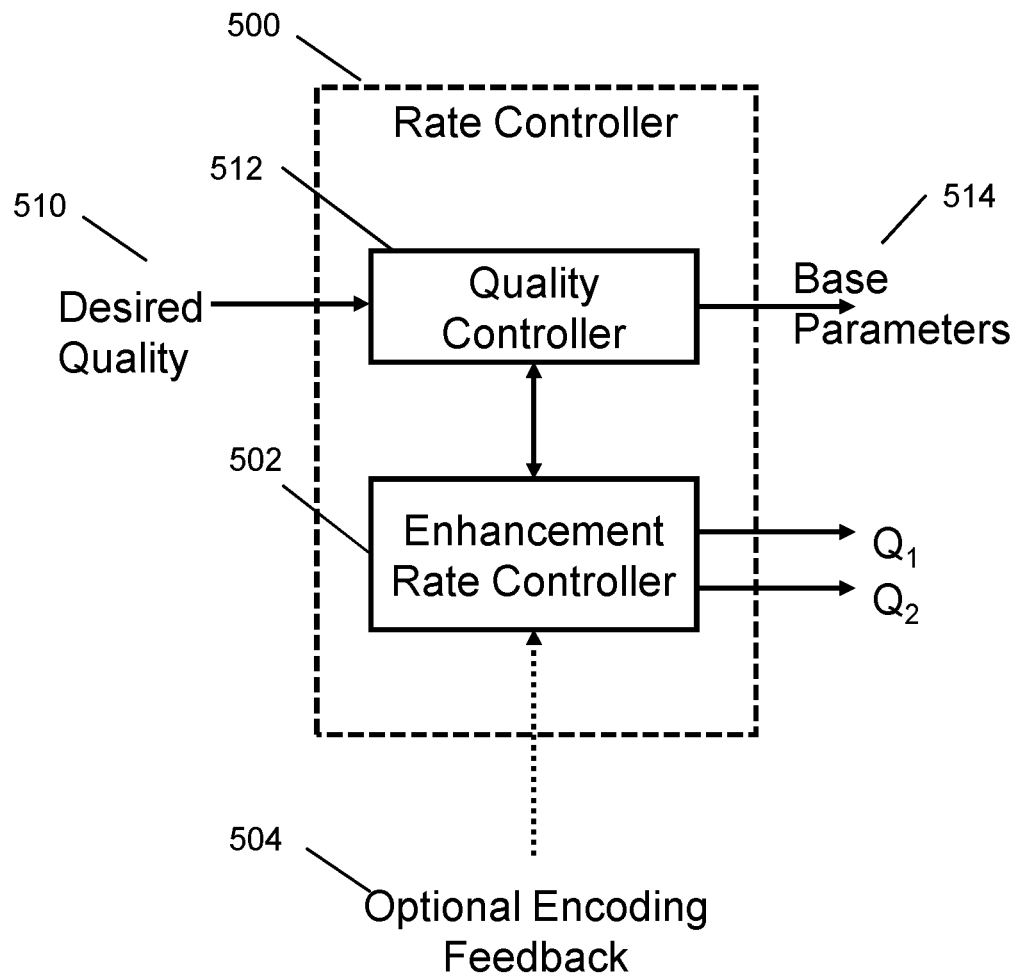
FIG. 5 shows a block diagram of a rate controller according to a second example.

FIG. 5 shows a further example of a rate controller 500 that implements a second rate control mode as discussed above. In certain cases, the rate controller 500 of FIG. 5 may be the same as rate controller 400 but represent a change in operating parameters, e.g. where additional components are used and/or instantiated. In other cases, the rate controller 500 of FIG. 5 may be hard-coded or configured to implement the second rate control mode as opposed to the first rate control mode.

The rate controller 500 of FIG. 5 shares certain features with the rate controller 400 of FIG. 4. An enhancement rate controller 502 again is configured to output a set of quantisation parameters $Q_1$ and $Q_2$, which may control quantisation in the two enhancement encoding layers as described above. The rate controller 500 differs from the rate controller 400 of FIG. 4 in that it is configured to receive an indication of a desired quality level 510 for the hybrid video stream. The rate controller 500 is then configured to adjust the operating parameters of the enhancement and/or base levels encoding components to provide this desired quality level 510. In FIG. 5, the indication of a desired quality level 510 is received by a quality controller 512 that forms part of the rate controller 500. The quality controller 512 in FIG. 5 is configured to control the enhancement rate controller 502 according to the indication of a desired quality level 510, e.g. the quality controller 502 may adjust the operation of the base level and the enhancement level (including the encoding of level 1 and level 2 streams) to meet or aim towards the indication of a desired quality level 510. In FIG. 5, the quality controller 512 outputs base parameters 514 which are used to encode the base level or layer of the hybrid stream (e.g. control a base codec such as 120 in FIG. 1).

Thus in FIG. 5 there is shown a further example of a rate control process, one in which the base layer as well the enhancement layers of the hybrid stream are encoded to aim to achieve an externally supplied indication of quality via the rate controller 500.

As shown in FIG. 5, the rate controller 500 receives the indication of the desired quality level for the encoding 510. The indication of a desired quality level 510 may be a predetermined value (e.g. as loaded from a configuration file or other data storage), or it may be input by a user. The indication of a desired quality level 510 may comprise a value within a predetermined range of values that map onto a predetermined range of quality values for the output decoded video (e.g. the reconstructed level 2 signal output by the decoder). The indication of a desired quality level 510 may be a form of Constant Rate Factor; however, comparative Constant Rate Factors are typically designed for single encoding schemes, e.g. such as those that may be implemented at the base level, as opposed to hybrid schemes that encompass different encoding approaches. In the art, there is a challenge of adapting such hybrid schemes to use a parameter similar to a Constant Rate Factor. For example, the use of different encoding approaches in the base and enhancement levels means that it is not possible to control both levels with a common shared quality factor and further that both levels, and the sub-layers of the enhancement streams, may have variable bit rates that depend on input image content.

In one case, indication of a desired quality level 510 may comprise an 8-bit integer value that represents a defined quality range. The indication of a desired quality level 510 may be defined such that the range is similar to the range used for known video codecs, e.g. for AVC and HEVC a range of 0 to 51 is used where lower values indicate a higher quality and higher values represent a lower quality. In this case, the rate controller 500, and in particular the quality controller 512, is configured to convert the indication of a desired quality level 510 into control instructions for the enhancement rate controller 502 and into base parameters 514 for the base codec. For example, the quality controller 512 controls bit rates for the base and two enhancement streams by setting the base parameters 514 and by controlling the enhancement rate controller 502. The indication of a desired quality level 510 thus sets an initial quality factor that is used by the quality controller 512 to control the enhancement rate controller 502 to determine the quantisation parameters $Q_1$ and $Q_2$ for the enhancement layers. The rate controller 500 thus sets the bit rates for the hybrid streams so as to meet or aim for the indication of a desired quality level 510.

The indication of a desired quality level 510 may be expressed using one or more different initial parameters. The indication of a desired quality level 510 may be independent of similar indications available for the base and/or enhancement layers. The quality controller 512 may map the indication of a desired quality level 510 to a number of base parameters 514 for controlling the base layer. The base parameters 514 may comprise one or more of a base mode (such as constant bit rate, variable bit rate or constant quality factor modes), a base bit rate, a base buffer size and a maximum base bit rate.

The indication of a desired quality level 510 may comprise a single parameter, e.g. an integer value and/or may comprise an array of different desired settings. In one case, the indication of a desired quality level 510 may be provided together with additional constraints and/or properties of an input video to be encoded. For example, the indication of a desired quality level 510 may comprise, be a function of, or may be accompanied by parameters such as an input resolution of the video, an available bit rate, and a set of spatial scaling parameters (e.g. such as whether to use up/down sampling in both image directions or in a horizontal direction only). In an embodiment the desired quality input 510 is dependent on the encoding standard used to encode the video stream. In certain cases, the indication of a desired quality level 510 may comprise, be a function of, or may be accompanied by parameters to either use to set or to override default values for the base parameters 514. For example, if a base mode of operation is passed to the quality controller 512, this may be used to explicitly set a base mode in the base parameters 514. In a preferred case, the indication of a desired quality level 510 is static for an encoding of a supplied video signal or file, e.g. is used to encode the video. However, by way of the quality controller 512, one or more of the underlying control parameters, including the quantisation parameters $Q_1$ and $Q_2$ may (and will likely) vary from frame to frame to attempt to meet the desired quality level 510.

As described with reference to FIGS. 1 to 3, based on the base parameters 514 the encoder controls the base codec 102. As is discussed above, the base codec 102 receives a downsampled input video such that base encoding and decoding is performed using the base parameters 514 at a resolution that is lower than a resolution of the input video. Similarly, the level 1 enhancement stream is typically encoded at the same resolution as the base layer and the level 2 enhancement stream is typically encoded at the same, higher, resolution of the input signal. The quality controller 512 is arranged to control the bit rates of the base and enhancement encoders so as to meet or aim for the indication of a desired quality level 510 with the presence of multiple resolutions. This again means that controlling the bit rates is a non-trivial operation.

In certain case, the quantisation parameters $Q_1$ and $Q_2$ are different from the base parameters 514. For example, the base parameters 514 may control the base codec 120 of FIG. 1 in a "black box" or modular manner using available external interfaces (e.g. hardware and/or application programming interfaces) of the base codec. However, the rate controller 500 may have more privileged access to the internal control of the enhancement encoding blocks and so can set the quantisation parameters $Q_1$ and $Q_2$ at a lower or more precise level of control. The base codec may itself use quantisation parameters internally within its encoding structure; however, these parameters are typically not configurable externally (e.g. there may be no or reduced access via the interface of the base codec and/or it may not be possible to pass information to the base codec to enable changes in quantisation parameters while encoding). Preferably the base encoded stream, or layer, is encoded independently from the enhancement streams.

Optionally, as described in detail below, the enhancement rate control 502 also receives a further input indicating encoding feedback 504. This may comprise feedback from the enhancement level encoding operations (e.g. blocks 100-1 and 100-2 in FIG. 1) and/or sub-components of these operations. This may comprise feedback from encoding one or more previous frames or blocks of the video signal. This may also comprise feedback from the base layer (e.g. the base codec using a standard reporting interface).

Using the rate controller 500 of FIG. 5, the level of quantisation may be constant or vary to meet or attempt to meet the indication of desired quality 510. For example, the quantisation parameters $Q_1$ and $Q_2$ may be controlled to meet one or more bit rates or bit rate ranges, or constraints, that are set based on the indication of desired quality 510. In one case, the base parameters 514 are set as static parameters for an encoding and the quantisation parameters $Q_1$ and $Q_2$ are variable within the context of the selected static base parameters 514 to meet or attempt to meet the indication of desired quality 510.

In examples where the level of quantisation varies, the enhancement rate controller 502 may set bounds on the quantisation parameters $Q_1$ and $Q_2$ for each enhancement stream. For example, upper and lower bounds may be set based on the indication of desired quality 510 such that the subjective level of quality (that is the level of quality as perceived by a user) remains unchanged, or unnoticeable. This allows for the rate controller 500 to encode the video stream in a flexible manner without a perceptible loss of quality, even during complex scenes. As the amount of data stored in an output buffer varies, the optional encoding feedback module 504 may provide further information relating to the capacity of the buffer to the enhancement rate controller 502. This information may be used to adjust the quantisation parameters $Q_1$ and $Q_2$ for each enhancement stream.

Figure 6:
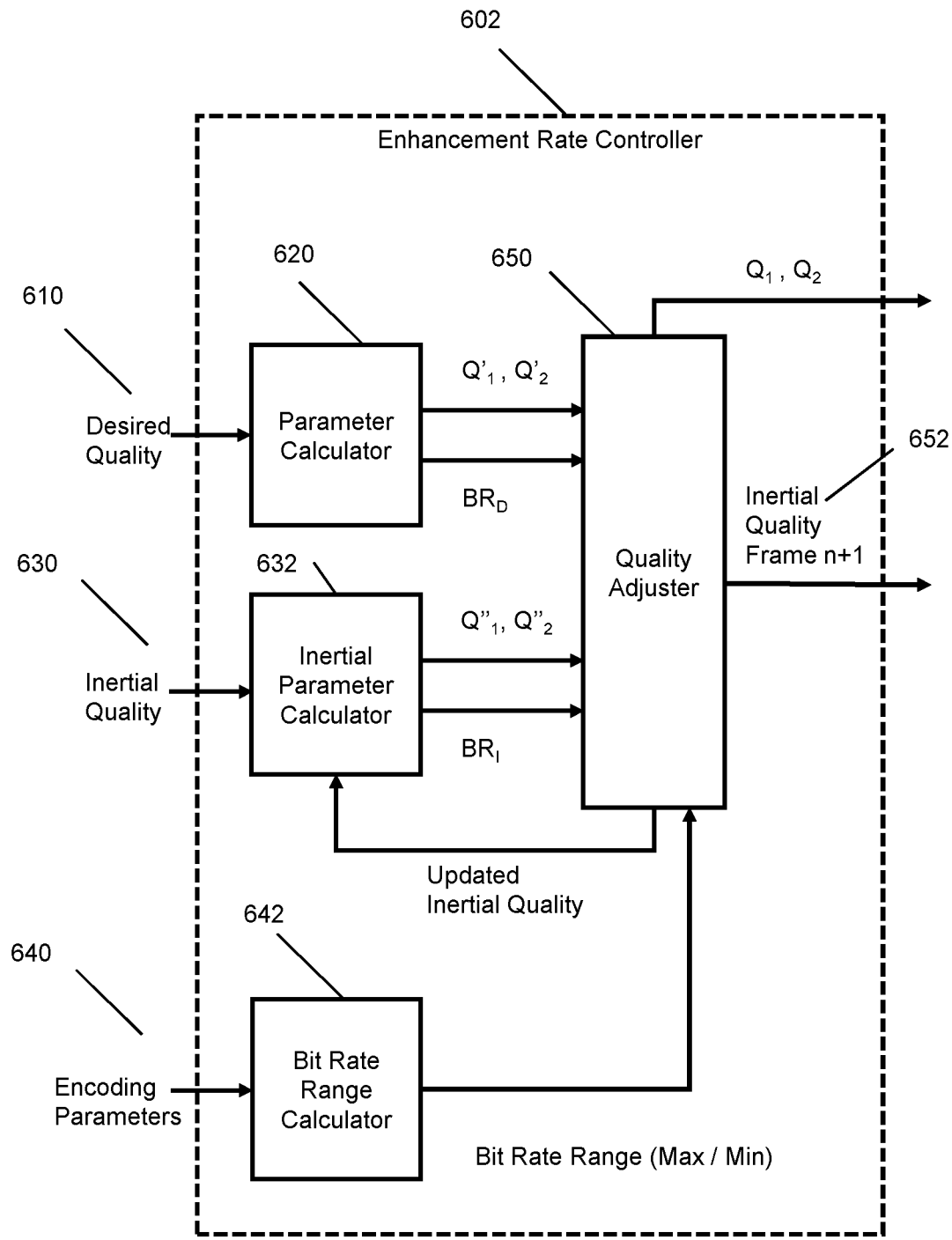
FIG. 6 shows a block diagram of an enhancement rate controller according to an example.

FIG. 6 shows an example of an enhancement rate controller 602. The example shows certain internal components that may be implemented in certain cases to provide one or more of the enhancement rate controllers 402 and 502.

In FIG. 6, the enhancement rate controller 602 is again configured to output quantisation parameters $Q_1$ and $Q_2$ for encoding a given frame (or coding unit) of a video signal. In the example of FIG. 6, the enhancement rate controller 602 adjusts the bit rate for each enhancement stream by determining the quantisation parameters $Q_1$ and $Q_2$ based on multiple input parameters. In particular, the enhancement rate controller 602 is configured to determine quantisation parameters $Q_1$ and $Q_2$ for each frame in a set of multiple frames of video to be encoded. Feedback from the encoding of a previous frame may be used to set the quantisation parameters $Q_1$ and $Q_2$ for a current frame.

For example, a first frame $f_0$ may be encoded and the quantisation parameters $Q_1$ and $Q_2$ may be determined for this first frame. A subsequent frame of video data, $f_1$, is then to be encoded. In this case, the enhancement rate controller 602 is configured preferably to use encoding data from the preceding frame $f_0$ to determine the quantisation parameters $Q_1$ and $Q_2$ for the subsequent frame. For example, the settings for the preceding frame (or one or more other previous frames) may be used to determine initial values of the quantisation parameters $Q_1$ and $Q_2$ for the subsequent frame, where the enhancement rate controller 602 is configured to search for new values for the quantisation parameters $Q_1$ and $Q_2$ from this starting point. Thus the encoding parameters from a previous frame provide a form of feedback for use in setting the quantisation parameters $Q_1$ and $Q_2$ for subsequent frames. As the hybrid video stream is constructed such that frames may be encoded independently of each other, whilst the following is described with reference to a preceding frame and a subsequent frame for ease of understanding, the preceding frame need not necessarily be the frame immediately preceding the subsequent frame.

In FIG. 6, the enhancement rate controller 602 receives an indication of a desired quality level 610. This may comprise the same indication of the desired quality level 510 that is input to the rate controller 500 in FIG. 5. In other cases, the quality controller 512 may adjust the indication of a desired quality level 510 before passing it to the enhancement rate controller 602 of FIG. 6. The indication of a desired quality level 610 is input to a parameter calculator 620. The parameter calculator 620 is configured to process the indication of a desired quality level 610 (and optionally one or more additional parameters) and output the quantisation parameters $Q'_1$ and $Q'_2$ for each enhancement stream as well as a desired bit rate $BR_D$. The desired bit rate $BR_D$ may comprise an estimated bit rate for the hybrid video stream (and/or one or more of the enhancement streams) in the case that the output quantisation parameters $Q_1$ and $Q_2$ are used to attempt to meet the input indication of a desired quality level 610. The enhancement rate controller 602 further receives an inertial quality level indication 630, which is input to an inertial parameter calculator 632. The inertial parameter calculator 632 replicates a functionality of the parameter calculator 620 but receives a different input (and hence generates different output). For example, the parameter calculator 620 and the inertial parameter calculator 632 may comprise different instantiations of a common program code class and/or duplicates of a common hardware chip. The inertial parameter calculator 632 outputs quantisation parameters $Q''_1$ and $Q''_2$ for each enhancement stream as well as an inertial bit rate $BR_I$. The inertial bit rate $BR_I$ may comprise an estimated bit rate for the hybrid video stream (and/or one or more of the enhancement streams) in the case that the output quantisation parameters $Q''_1$ and $Q''_2$ are used to attempt to meet the input inertial indication of a desired quality level 630. Lastly, the enhancement rate controller 602 also receives an encoding parameter input 640. This may comprise an input similar to the encoding feedback 404 and 504 of FIGS. 4 and 5. The encoding parameter input 640 may comprise one or more operating parameters such as one or more of a frame type, a bit rate of the base layer, a minimum desired bit rate (e.g. as determined by the quality controller 512), and a target bit rate based on a previous encoding. The encoding parameter input 640 is provided to a bit rate range calculator 642. The bit rate range calculator 642 receives the encoding parameter input 640 and determines a bit rate range, such as a maximum and minimum bit rate for the hybrid video stream (or for one or more of the individual enhancement streams).

The outputs of the parameter calculator 620, the inertial parameter calculator 632 and the bit rate range calculator 642 are input to a quality adjuster 650. The quality adjuster 650 is configured to process the input and determine a final set of quantisation parameters $Q_1$ and $Q_2$ for a current frame to be encoded. In one case, the quality adjuster 650 determines whether one or more of the received desired bit rate $BR_D$ and inertial bit rate $BR_I$ from the parameter calculator 620 and the inertial parameter calculator 632 are within the bit rate range output by the bit rate range calculator 642. If one of the input bit rates is within the bit range, a corresponding one of the quantisation parameters $Q'_1$ and $Q'_2$ and quantisation parameters $Q''_1$ and $Q''_2$ are selected and used as the quantisation parameters $Q_1$ and $Q_2$ that are output by the enhancement rate controller 602. In none of the input bit rates are within the bit rate range then the quality adjuster 650 also outputs an updated inertial indication of a desired quality level to the inertial quality calculator 632. The updated inertial indication of a desired quality level is an updated version of the inertial indication of a desired quality level 630. The quality adjuster 650 uses the output of the parameter calculator 620 as a reference to adjust the inertial indication of a desired quality level 630 in a direction that is associated with an increase or reduction of the bit rate so as to fall within the bit rate range. The inertial parameter calculator 632 is then iteratively activated to output revised quantisation parameters $Q''_1$ and $Q''_2$ and a revised inertial bit rate $BR_I$ based on the updated inertial indication of a desired quality level received from the quality adjuster 650. This feedback loop may be iterated until a revised inertial bit rate $BR_I$ fall within the bit rate range from the bit rate range calculator 642. When a bit rate output by one or more of the parameter calculator 620 and the inertial parameter calculator 632 is found to fall within the bit rate range, and a final set of quantisation parameters $Q_1$ and $Q_2$ are output, the quality adjuster 650 is also configured to output an inertial indication of a desired quality level 652 to be used for a next frame (e.g. frame n+1). The desired quality level output 652 may be used as the inertial indication of a desired quality level 630 for the next frame (whereas the indication of a desired quality level 610 may be constant for a next frame depending on the operation of the quality controller 512).

As described above, the enhancement rate controller 602 takes the multiple input parameters to output a final set of quantisation parameters $Q_1$ and $Q_2$ for each enhancement stream and an inertial frame quality indication for a next frame at the desired quality level 652.

For a first frame of video data, or where an inertial indication of a desired quality level 630 is not available, the inertial indication of a desired quality level 630 may be set as the initial indication of a desired quality level 610. As per FIG. 4, this may be an initial user-set, or otherwise predetermined, value. The indication of a desired quality level 610, the inertial indication of a desired quality level 630 or the inertial indication of a desired quality level 652 may have a common format and may be any suitable objective quality metric. In one case, they may be an 8-bit integer value within a predefined range of quality values representing a perceptive quality of an output decoded video.

The parameter calculator 620 and the inertial parameter calculator 632 both determine a level of quantisation required for each level of enhancement based on an indication of quality. Furthermore, based on the level of quantisation required the bit rate required to encode the frame of data at or near the desired quality is also calculated. The total amount of data required to encode a frame using the hybrid encoding scheme described herein may be dependent on a complexity of a scene in the video signal and so may change from frame to frame. As such, different quantisation parameters may be determined for different frames with a constant indication of a desired quality level 610. The enhancement rate controller 602 thus is a dynamic system where the outputs of the components change per frame and for a given frame.

The encoding parameter input 640 defines a number of parameters used in the encoding process. These may include a target rate factor (or quality level) and target bit rate. The encoding parameter input 640 may also include a range, in the form of the maximum and minimum value for such parameters. The bit rate range calculator 642 may compare different bit rate range indications as provided by the encoding parameter input 640 to determine an overall bit rate range.

In certain examples described in detail below, the encoder 100 utilises a buffer that is implemented according to a leaky bucket model to determine a level of quantisation for a frame of data. As the amount of data required to encode a frame may vary depending on the complexity of the frame, the contents of the buffer need to be controlled such that the buffer does not overflow (e.g. such that more data is encoded that may be supported by an available bandwidth or bit rate). In this case, the encoding parameter input 640 may comprise measurements associated with the buffer such as a buffer capacity and a minimum bit rate to fill the buffer. Measurements associated with the buffer (i.e. leaky bucket parameters) may thus be used by the bit rate range calculator 642 to determine a bit rate range for one or more enhancement streams.

Using the rate controller 400 and 500 of FIGS. 4 and 5, and the enhancement rate controller 600 of FIG. 6, a frame of video may be encoded with multiple levels of quantisation, with preferably each of the base stream and the two enhancement streams being encoded at different levels of quantisation. The encoding within these examples is repeated for multiple frames using a frame-by-frame process. As described above, for each frame, the encoding process therefore comprises reconstructing a frame of video at each respective resolution of the two enhancement streams and subsequently comparing the reconstructions with video data derived from a frame of the input video, said video data corresponding to the respective resolutions of the enhancement streams. Such a comparison therefore allows for the differences between the original and reconstructed frames to be made. For example, as shown in FIGS. 1 and 3, for each frame, a set of residuals for the frame of video is generated at each of two enhancement levels based on the comparison, and these residuals are encoded using the quantisation parameters for the two enhancement streams that are output by the rate controller 400 and 500 of FIGS. 4 and 5 (e.g. via the operation of the enhancement rate controller 600). The process may be repeated across multiple frames of data, so as to encode a complete video (e.g. a video file or video stream for transmission). The frames are encoded within the hybrid stream so as to meet or attempt to meet the input indication of a desired quality level 510 or 610. This provides a simple way in which a non-technical user may set complex technical quantisation parameters for multiple different encoding approaches so as to obtain a desired level of quality.

Figure 7A:
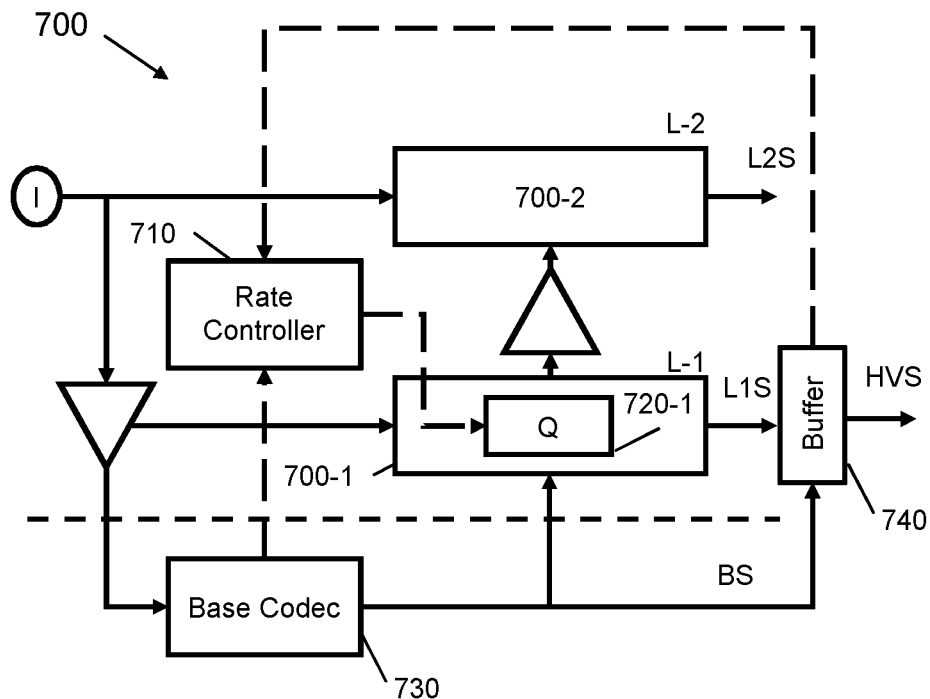
FIG. 7A shows a block diagram of an example rate controller being using within an encoder for a first enhancement stream.
Figure 7B:
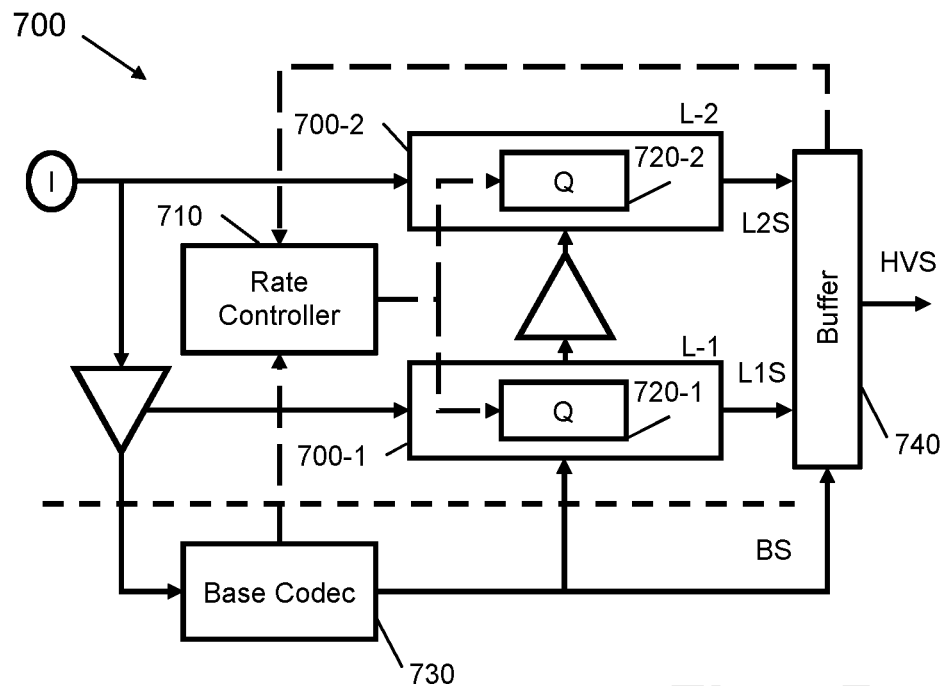
FIG. 7B shows a block diagram of an example rate controller being using within an encoder for a multiple enhancement streams.

FIGS. 7A and 7B show a schematic diagram of an example encoder 700. This may comprise the encoder 100 shown in FIGS. 1 and 3. FIGS. 7A and 7B show how the rate controller of the previous examples (e.g. the rate controller 400 or 500 of FIG. 4 or 5) may be implemented within the context of the encoder 100 as shown in FIG. 1 or 3. FIG. 7A shows a rate controller 710 arranged to control a quantisation block 720-1 within a first enhancement encoder 700-1. FIG. 7B shows the same rate controller 710 arranged to control quantisation blocks 720-1 and 720-2 within the first enhancement encoder 700-1 and a second enhancement encoder 700-2. The rate controller 710 may comprise a software routine (e.g. in a fast low-level language like C or C++) and/or dedicated electronic circuitry. Both Figures, show a base codec 730 that is configured to perform encoding and decoding operations according to a base video coding approach, which differs from the coding of the enhancement levels. The base codec 730 outputs an encoded base stream (BS), the first enhancement encoder 700-1 outputs a first encoded enhancement stream (LS1) and the second enhancement encoder 700-2 outputs a second encoded enhancement stream (L2S). The example encoder 700 of FIGS. 7A and 7B also comprises a buffer 740 to receive one or more of the encoded streams. The buffer 740 is used to store and/or combine the encoded base stream and at least one of the two encoded enhancement streams. The buffer 740 may comprise a software-defined buffer (e.g. a reserved section of memory resources) and/or a dedicated hardware buffer. The buffer 740 is configured to combine multiple encoded streams to output a hybrid video stream (HVS).

In the example of FIG. 7A and FIG. 7B, the rate controller 710 receives data from the base processing layer (e.g. at least the base encoder of the base codec 730) and the buffer 740. This data may comprise the encoder parameter input 640 shown in FIG. 6 or the encoding feedback 404 and 504 of FIGS. 4 and 5.

Figure 8:
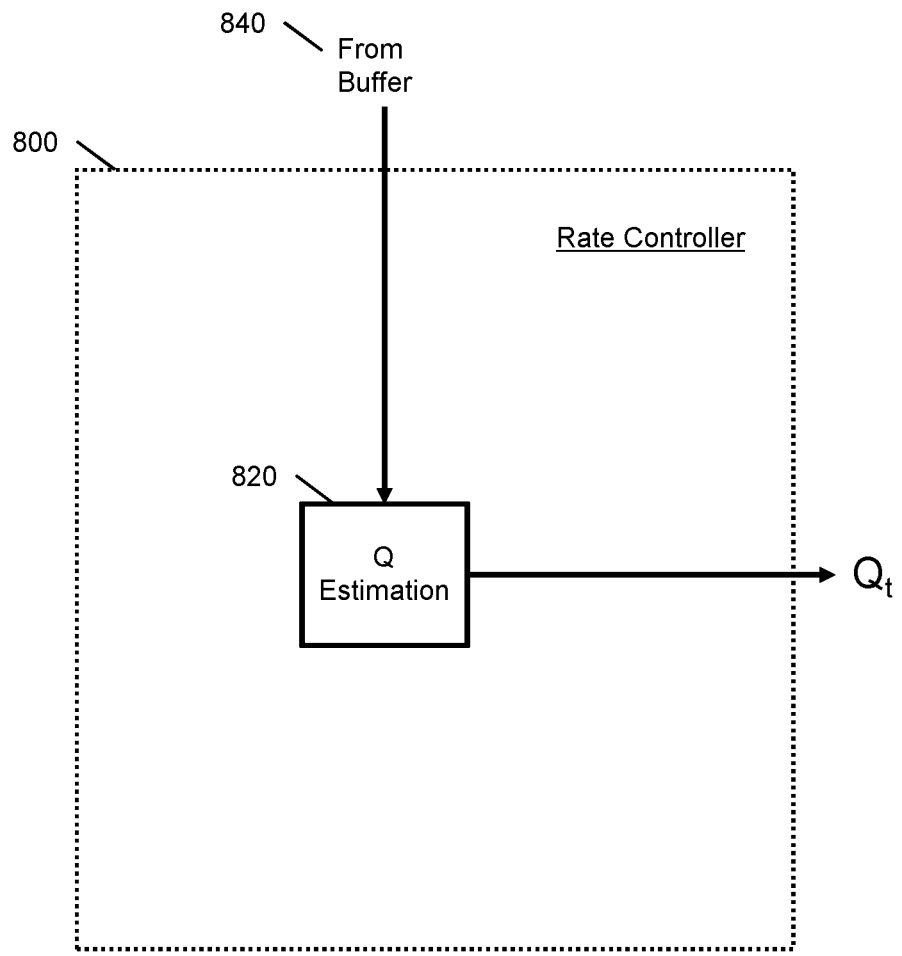
FIG. 8 shows a block diagram of a rate controller according to a third example.

FIG. 7A shows the use of the buffer 740 with respect to the encoded base stream and the first encoded enhancement stream; FIG. 7B shows another example, where the buffer receives the encoded base stream and both encoded enhancement streams. Whilst the rate control process shown with respect to FIGS. 6 to 8 is shown with two enhancement streams. The number of enhancement streams may be greater than, or less than, two.

In the example of FIG. 7A, the rate controller 710 controls quantisation within the first enhancement encoder 700-1 by supplying a set of quantisation parameters $Q_1$. In the example of FIG. 7B, the rate controller 710 controls quantisation within both enhancement encoding layers by supplying quantisation parameters to respective "Quantise" components i.e. by supplying quantisation parameters $Q_1$ and $Q_2$ to quantisation blocks 720-1 and 720-2 (which may be an implementation of the quantisation blocks 120-1 and 120-2 from one or more of FIGS. 1 and 3). In yet another case (not shown), the buffer 740 may be configured to receive the encoded base stream and the second encoded enhancement stream.

In the examples of FIGS. 7A and 7B, the buffer 740 may be configured to receive inputs at variable bit rates (e.g. encoded streams at variable bit rates) while the output (i.e. the hybrid video stream) is read at a constant bit rate. In other cases, the output may be output at a variable bit rate but constrained by the indication of a desired level of quality as described with reference to FIG. 6. The rate controller 710 may read the status from the buffer 740 to ensure it does not overflow or get empty, and control the data that is passed to the buffer to ensure there is always data available to be read at its output. For example, the encoder parameter input 640 in FIG. 6 may comprise a minimum bit rate required to fill the buffer 740 and a maximum bit rate or capacity of the buffer 740. These may be used to control a bit rate range as described with reference to FIG. 6.

Figure 9:
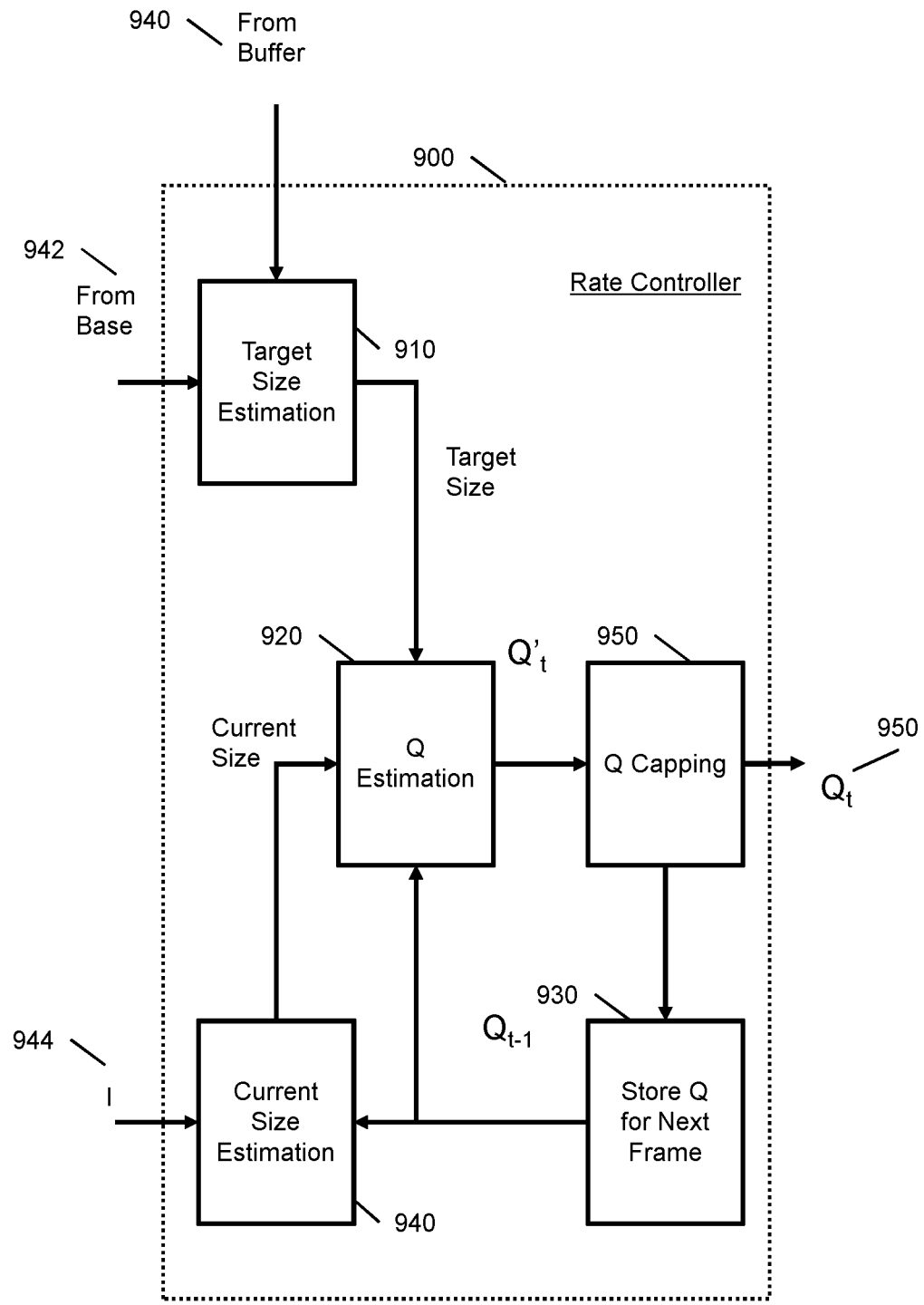
FIG. 9 shows a block diagram of a rate controller according to a fourth example.

FIG. 8 shows a third example of a rate controller 800 that may be used to control a bit rate of one or more data streams within the encoder 100 of FIGS. 1 and 3. It may be seen as a variation of any one of the previously described encoders. FIG. 9 shows a fourth example of a rate controller 900, which is a more advanced variation of the third example of the rate controller 800. FIGS. 8 and 9 show two possible implementations of a rate controller that is compatible with a leaky bucket model. In particular, FIGS. 8 and 9 show one manner in which the optional encoding feedback 404 or 504 of FIGS. 4 and 5 may be implemented. It may be seen as a variation of the use of the inertial parameters of FIG. 6.

The rate controller 800 and 900 of FIGS. 8 and 9 both receive a status 840, 940 of a buffer (such as the buffer 740 of FIGS. 7A and 7B) to generate a set of quantisation parameters $Q_t$ for a current frame t. The quantisation parameters may be supplied to the "Quantise" component in one or more of the Level-1 and Level-2 encoding pipelines as shown in FIG. 3. Although, the examples of FIGS. 8 and 9 are described with reference to a single enhancement level, they may be adapted according to the examples of FIGS. 4 to 6 to provide quantisation parameters for multiple enhancement levels (or repeatedly implemented for each of a plurality of enhancement levels).

In both examples, the general operation of the rate controller 800, 900 may be as follows. The set of quantisation parameters $Q_t$ are adjusted based on feedback from the buffer.

This feedback may indicate an amount of data within the buffer (e.g. a capacity or the like). In both FIGS. 8 and 9, an indication of the amount of data within the buffer (i.e. how "full" the buffer is) is received via the "From Buffer" signal 840, 940. This is then used, either directly or indirectly by a Q estimation component 820, 920 to estimate a set of quantisation parameters $Q_t$ that are used as the "Quantise" operating parameters.

For example, the Q estimation component 820 in FIG. 8 may be configured to receive the From Buffer signal 840 and determine whether the buffer is approaching capacity (i.e. is becoming "full"). This may be performed directly (e.g. using an indication of remaining capacity) and/or indirectly (e.g. using a bit rate such as a bpp capacity). If the buffer is approaching capacity, the Q estimation component 820 is configured to adjust the quantisation parameters $Q_t$ to reduce the amount of data required. In a similar manner to the use of the encoding parameter input 640 of FIG. 6, the From Buffer signal 840 may comprise (or be used to determine) a maximum and minimum range (e.g. relating to a size of the buffer), and the quantisation parameters may be adjusted to in turn adjust the number of bits required to encode a frame such that it falls within the range.

In one case, the set of quantisation parameters values $Q_t$ may be proportional to the amount of data in the buffer. For example, if, at the moment of receiving a new frame, there is a large amount of data within the buffer (i.e. that the buffer is approaching capacity) then the Q estimation component 820 may set a high value of $Q_t$ (e.g. such as a large step or bin size) in order to reduce the amount of residual data that is encoded.

In certain examples, the quantisation parameter $Q_t$ may be used to set a quantisation step-width, where the quantisation step-width is inversely proportional to the value of the quantisation parameter $Q_t$. In this case, low values of $Q_t$ may correspond to larger quantisation stepwidth values that result in fewer quantisation bins or groups for a given range of residual values and as such the set of quantisation parameters values $Q_t$ may be inversely proportional to the amount of data in the buffer. In this case, if the buffer is relatively empty then the rate controller is configured to set high values of $Q_t$ (i.e. low stepwidth values) to encode more residual data into the hybrid video stream. Different approaches may be applied depending on how a quantisation step width is determined from the one or more quantisation parameters.

In general, in the example of FIG. 8, the rate controller 800 allows for an adaptive rate control process where the amount of data in the buffer is used to determine the level of quantisation for one or more enhancement layers.

The example of FIG. 9 uses additional components to determine the set of quantisation parameters. In the example of FIG. 9, the rate controller 900 also receives encoder parameters from the base encoder. These are shown as the "From Base" signal 942 that is input to the rate controller 900. The From Base signal 942 may form part of the encoder parameter input 640 in FIG. 6. In one case, the From Base signal 942 may indicate a bit rate that is being used by the base encoder (e.g. as part of the base codec 120). If the base encoder is configured to use a variable bit rate encoding format, then the bit rate used by the base encoder may vary over frames. The current bit rate of the base encoder may thus be used to determine quantisation parameters for the enhancement streams.

In one case, the From Base signal 942 may also indicate an amount of "filler" data the base encoder intends to add to its flow. In this case, the encoder may replace the base encoder "filler" data with extra enhancement stream data to maximize the available bandwidth. In this case, if there is a high level of filler, the rate controller 900 may be able to set quantisation parameter $Q_t$ values that result in a lower step width, such that more residual data is received within the buffer. This is possible because the "filler" data may be removed or replaced in the base encoder stream (e.g. either before or at the buffer) as it is not required to decode the base encoded stream.

In FIG. 9, the rate controller 900 comprises a target size estimation component 910. This receives the From Buffer signal 940 and the From Base signal 942. The target size estimation component 910 may be configured to receive a status of the buffer via the From Buffer signal 940 and information regarding the amount of "filler" data that the base encoder is planning to add to a frame via the From Base signal 942. The target size estimation component therefore determines a target data size for the frame. The amount of data held within the buffer may be indicated by a "fullness" parameter that may be normalised within a range of 0 to 1, or 0% to 100%—where 60% indicates that the buffer is 60% full (i.e. has 40% of remaining space). In this case, a mapping function or lookup table may be defined to map from "fullness" bins to a "target size" parameter, where the target size is a target size for a next frame to be encoded by one or more of the first and second enhancement layers. In one case, the mapping function or lookup table may implement a non-linear mapping that may be set based on experimentation. In one case, the target size estimation may also be set based on a configuration parameter that indicates a desired proportion of the hybrid video stream that is to be filled by the enhancement stream (e.g. with the remainder of the hybrid video stream being filled by the base stream).

In the example of FIG. 9, the target size determined by the target size estimation component 910 is communicated to the Q estimation component 920. In FIG. 9, the Q estimation component 920 additionally receives inputs from a parameter buffer 930 that stores a set of quantisation parameters $Q_{t-1}$ from a previous frame. As such, in a similar manner to FIG. 6, there is a provided a feedback mechanism in which the amount of data used to encode a first frame is used to set the quantisation parameters for encoding subsequent frames.

In FIG. 9, the Q estimation component 920 receives a target size from the target size estimation component 910, a set of quantisation parameters $Q_{t-1}$ from a previous frame, and a size of a current frame (a current data size) encoded with the set of quantisation parameters $Q_{t-1}$ from a previous frame ("current size"). The size of the current frame may be supplied by a current size estimation component 940. The current size estimation component 940 may use at least a part implementation of at least one of the enhancement encoding pipelines (e.g. L-1 or L-2 components) to determine the current size based on an input from the parameter buffer 930. The current size estimation component 940 may comprise a version of the inertial parameter calculator 632 of FIG. 6, in that it simulates a size metric for encoding a given frame, given a set of encoding data from a previous frame. In one case, the "current size" information may be determined by a parallel copy of at least one of the enhancement encoding pipelines, e.g. the current frame is to be quantised with quantisation parameters $Q_t$ for transmission but the current size estimation component 940 receives $Q_{t-1}$ and determines a current size based on these quantisation parameters by performing an encoding that is not transmitted. In another example, a current size may be alternatively received from a cloud configuration interface, e.g. based on pre-processing for a pre-recorded video. In this other example, such as that shown in FIG. 6, a parallel implementation may not be required.

In FIG. 9, the Q estimation component 920 takes its input (e.g. as described above) and computes an initial set of estimated quantisation parameters $Q'_t$. In one case, this may be performed using a set of size functions that map a data size (e.g. as expressed by target or current size) to a quantisation parameter. The data size and/or the quantisation parameter may be normalised, e.g. to values between 0 and 1. The quantisation parameter may be associated with a quantisation step size, e.g. it may be a "Quality factor" that is inversely proportional to a quantisation step size and/or may be the quantisation step size.

In the example of FIG. 9, a set of curves may be defined to map a normalised size onto a quantisation parameter. Each curve may have one or more of a multiplier and an offset that may depend on the properties of a current frame (e.g. that may depend on a complexity of information to encode within the frame). The multiplier and the offset may define the shape of the curve. The multiplier may be applied to a size normalisation function that is a function of the quantisation parameter Q. In one case, the current size (i.e. the size of frame t encoded with $Q_{t-1}$) and $Q_{t-1}$ may be used to define a point within the space of the set of curves. This point may be used to select a set of closest curves from the set of curves. These may be a curve that is above the point and a curve that is below the point or a highest or lowest curve for the point. The set of closest curves may be used in an interpolation function together with the point to determine a new curve associated with the point. Once this new curve is determined, a multiplier and an offset for the new curve may be determined. These values may then be used together with the received target size to determine a value for $Q_t$ (e.g. the curve may define a function of size and Q).

In certain cases, at least the Q estimation 920 of the rate controller 900 is adaptive, wherein properties of one or more previous frames affect the Q estimation of a current frame. In one case, the set of curves may be stored in an accessible memory and updated based on a set of curves determined for a previous frame. In certain cases, adaptive quantisation may be applied differently for different coefficient locations within a coding unit or block, e.g. for different elements in an array of 4 or 16 coefficients (for 2×2 or 4×4 transforms).

Lastly, the example of FIG. 9 features a Q capping component 950 that receives the estimated set of quantisation parameters $Q'_t$ that are output from the Q estimation component 920 and corrects this set based on one or more factors. The Q capping component 950 may comprise a version or part of the quality adjuster 650. The estimated set of quantisation parameters $Q'_t$ may comprise one or more values. In one case, the initial set of quantisation parameters $Q'_t$ may be corrected based on one or more of operating behaviour of the base encoding layer and changes in the quantisation parameter $Q_t$. In one case, the estimated set of quantisation parameters $Q'_t$ may be capped based on a set of quantisation parameters used by the base encoding layer, which may be received with the data from this layer. In one case, either with or without the adaptation using the base encoding layer data, the estimated set of quantisation parameters $Q'_t$ may be limited based on values of a previous set of quantisation parameters. In this case, one or more of a minimum value and a maximum value for $Q'_t$ may be set based on a previous Q value (e.g. $Q_{t-1}$). The output of the capping is then provided as a final set of quantisation parameters $Q_t$ as shown by 950 in FIG. 9.

In one case, the set of quantisation parameters comprise one value for $Q_t$. In this case, a stepwidth applied by one of the Quantise components to a frame t may be set based on $Q_t$. The function to determine the stepwidth may also be based on a maximum stepwidth (e.g. stepwidths may range between 0 and 10). An example stepwidth computation is:

$$\text{Stepwidth} = [(1 - Q^{0.2}) \cdot (\text{Stepwidth}_{max} - 1)] + 1$$

Certain quantisation variations will now be described with reference to FIGS. 10A and 10B. These describe how quantisation parameters may be applied in one or more quantisation blocks.

Figure 10A:
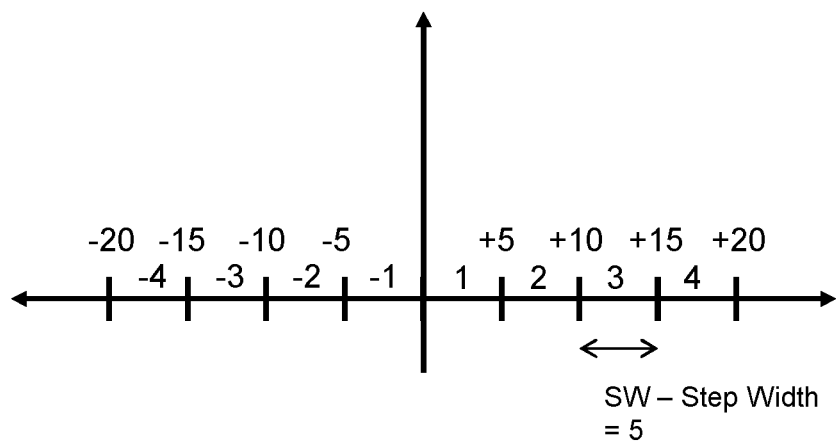
FIG. 10A shows an example of applying quantisation.

FIG. 10A provides an example of how quantisation of residuals and/or coefficients (transformed residuals) may be performed based on bins having a defined step width. FIG. 10A is provided for example only and there may be different ways of implementing quantisation as known in the art. In FIG. 10A, the x-axis of represents residual or transformed coefficient values. In this example a number of bins are defined with a stepwidth of 5. The size of the stepwidth may be selectable, e.g. based on a parameter value. In certain cases, the size of the stepwidth may be set dynamically, e.g. based on the rate control examples described above.

In FIG. 10A, the stepwidth results in bins corresponding to residual values in the ranges of 0-4, 5-9, 10-14, 15-19 (i.e. 0 to 4 including both 0 and 4). Bin widths may be configured to include or exclude end points as required. In this example, quantisation is performed by replacing all values that fall into the bin with an integer value (e.g. residual values of between 0 and 4 inclusive have a quantised value of 1). In FIG. 10A, quantisation may be performed by dividing by the stepwidth (e.g. 5), taking the floor of the result (i.e. the nearest integer less than a decimal for positive values) and then adding one (e.g. 3/5=0.6, floor(0.6)=0, 0+1=1; or 16/5=3.2, floor(3.2)=3, 3+1=4). Negative values may be treated in a similar way, e.g. by working on absolute values then converting to negative values following calculation (e.g. abs(−9)=9, 9/5=1.8, floor(1.8)=1, 1+1=2, 2*-1=−2). FIG. 10A shows a case of linear quantisation where all bins have a common stepwidth. It should be noted that various different implementations based on this approach may be enacted, for example, a first bin may have a quantised value of 0 instead of 1, or may comprise values from 1 to 5 inclusive. FIG. 10A is simply one illustration of quantisation according to bins of a given stepwidth.

Figure 10B:
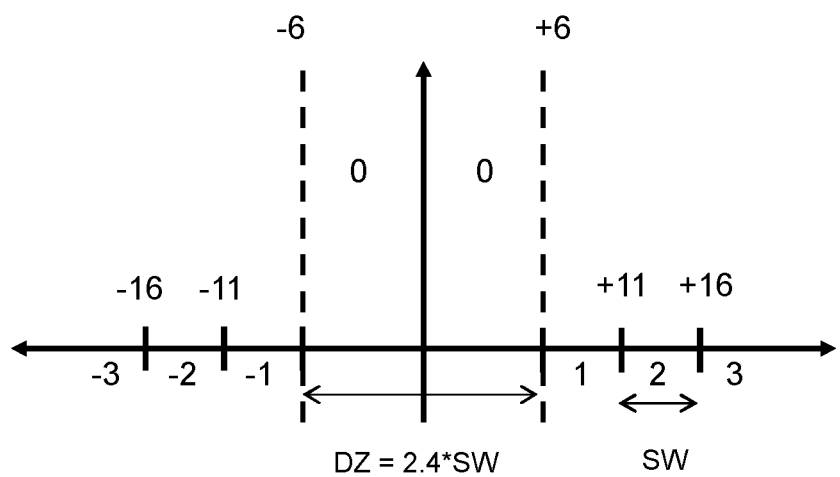
FIG. 10B shows an example of applying quantisation with a variable deadzone.

FIG. 10B shows how a so-called "deadzone" (DZ) may be implemented. In FIG. 10B, residuals or transformed coefficients with a value within a pre-defined range are set to 0. In FIG. 10B the pre-defined range is a range around a value of 0. In FIG. 10B, values that are less than 6 and greater than −6 are set to 0. The deadzone may be set as a fixed range (e.g. −6 to 6) or may be set based on the stepwidth. In one case, the deadzone may be set as a predefined multiple of the stepwidth, e.g. as a linear function of a stepwidth value. In the example of FIG. 10B the deadzone is set as 2.4*stepwidth. Hence, with a stepwidth of 5, the deadzone extends from −6 to +6. In other case, the deadzone may be set as a non-linear function of a stepwidth value.

In one case, the deadzone is set based on a dynamic stepwidth, e.g. may be adaptive. In this case, the deadzone may change as the stepwidth changes. For example, if the stepwidth were updated to be 3 instead of 5, a deadzone of 2.4*stepwidth may change from a range of −6 to +6 to a range of −3.6 to 3.6; or, if the stepwidth is updated to be 10, the deadzone may change to extend from −12 to 12. In one case, the multiplier for the stepwidth may range from between 2 and 4. In one case, the multiplier may also be adaptive, e.g. based on operating conditions such as available bit rates. Having a deadzone may help reduce an amount of data to be transmitted over a network, e.g. help reduce a bit rate. When using a deadzone, residual or coefficient values that fall into the deadzone are effectively ignored.

In one case, a stepwidth for quantisation may be varied for different coefficients within a 2×2 or 4×4 block of transformed coefficients. For example, a smaller stepwidth may be assigned to coefficients that are experimentally determined to more heavily influence perception of a decoded signal, e.g. in a Directional Decomposition (DD-Squared or "DDS") as described above AA, AH, AV and AD coefficients may be assigned smaller stepwidths with later coefficients being assigned larger stepwidths. In this case, a base_stepwidth parameter may be defined that sets a default stepwidth and then a modifier may be applied to this to compute a modified_stepwidth to use in quantisation (and de-quantisation), e.g. modified_stepwidth=base_stepwidth*modifier where modifier may be set based on a particular coefficient within a block or unit.

In certain cases, the modifier may also, or alternatively, be dependent on a level of enhancement. For example, a stepwidth may be smaller for the level 1 enhancement stream as it may influence multiple reconstructed pixels at a higher level of quality.

In certain cases, modifiers may be defined based on both a coefficient within a block and a level of enhancement. In one case, a quantisation matrix may be defined with a set of modifiers for different coefficients and different levels of enhancement. This quantisation matrix may be signalled between the encoder and decoder. In one case, the quantisation matrix may be constructed at the encoder using the quantisation parameters output by the rate controllers as described herein.

In one case, different quantisation modes may be defined. In one mode a common quantisation matrix may be used for both levels of enhancement; in another mode, separate matrices may be used for different levels; in yet another mode, a quantisation matrix may be used for only one level of enhancement, e.g. just for level 0. The quantisation matrix may be indexed by a position of the coefficient within the block (e.g. 0 or 1 in the x direction and 0 or 1 in the y direction for a 2×2 block, or 0 to 3 for a 4×4 block). These modes may depend on a rate control mode that is applied, and a number of enhancement layers that are controlled.

In one case, a base quantisation matrix may be defined with a set of values. This base quantisation matrix may be modified by a scaling factor that is a function of a stepwidth for one or more of the enhancement levels. In one case, a scaling factor may be a clamped function of a stepwidth variable. At the decoder, the stepwidth variable may be received from the encoder for one or more of the level-0 stream and the level-1 stream. In one case, each entry in the quantisation matrix may be scaled using an exponential function of the scaling factor, e.g. each entry may be raised to the power of the scaling factor.

Figure 11:
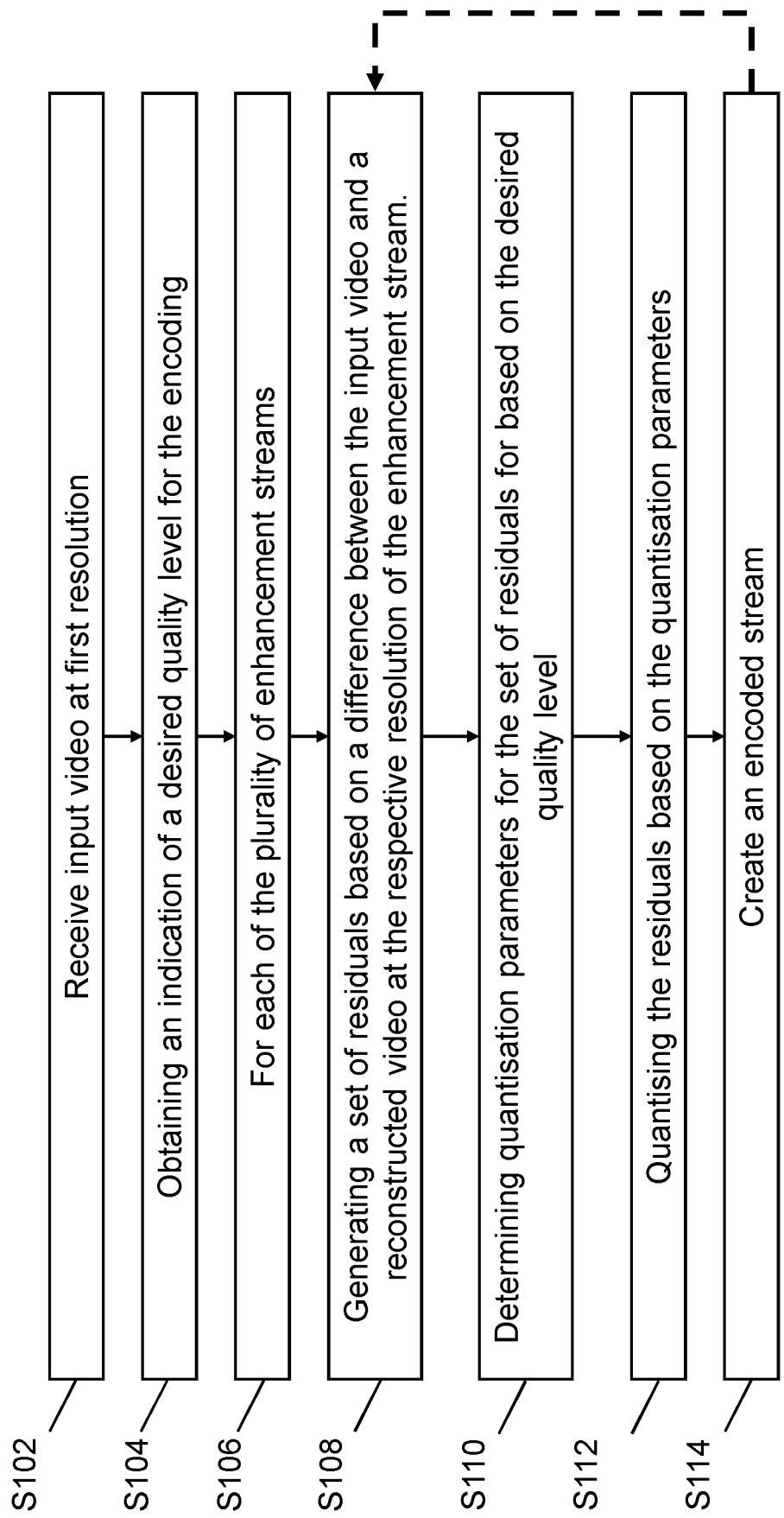
FIG. 11 shows a flow diagram showing a rate control method according to an example.

FIG. 11 is a flow chart of the encoding process according to an embodiment of the invention.

The encoding process may be implemented using the encoder 100 described herein and/or a different encoder. The encoding process is for encoding an input video as a hybrid video stream. The encoded hybrid video stream comprises a base encoded stream and a plurality of enhancement streams.

At step S102, an input video is received at a first resolution. The input video may be provided in any known format with a resolution. At step S104, the method comprises obtaining an indication of a desired quality level for the encoding. This may comprise a parameter within a defined range that is mapped to a set of output quality levels and/or may comprise a defined bit rate or bit rate metric. The encoding process produces the hybrid video stream. When decoded the hybrid video stream renders a video at a level of quality/quality level. The hybrid video stream comprises a base encoded stream at a second resolution and a plurality of enhancement streams at each of the first and second resolutions, the first resolution being higher than the second resolution.

At step S106, the method comprises encoding each of the plurality of enhancement streams. This may comprise instructing an iteration of steps S108 to S114 for each enhancement stream. At step S108, the method comprises generating a set of residuals based on a difference between the input video and a reconstructed video at the respective resolution of the enhancement stream. For example, at the first enhancement level described herein a resolution may be lower than a resolution of the input video. The generation of the residuals for each enhancement stream therefore provides corrective data, which when decoded with the base layer would render the video data at the respective resolution. At step S110, the method performs the step of determining quantisation parameters for the set of residuals based on the desired quality level. This may be performed using the rate controllers as described herein (such as those shown in any one of FIGS. 4 to 9). By determining the quantisation parameters based on the desired level of quality obtained at step S104, a quality level may be maintained during the encoding process despite varying bit rates due to encoding processing and/or frame content. At step S112, the method comprises quantising the residuals based on the quantisation parameters determined at step S110. This may comprise determining a step width using the quantisation parameters and performing quantisation as illustrated in one or more of FIGS. 10A and 10B. Via iteration of step S112, each of the enhancement streams are quantised based on the quantisation parameters determined for that stream. In preferred cases, the quantisation parameters for each enhancement stream are different; however, in certain example it may be desired to use the quantisation parameters for each stream. As the process is performed for each enhancement layer there is shown the optional returning of the process to step S108. At step S114, after the quantisation have been determined, the method proceeds to create an encoded stream from the set of quantised residuals. The encoded enhancement streams output by a repetition of step S114 may then be combined with a base encoded stream to generate the hybrid video stream. In certain cases, the base level and the enhancement streams are encoded separately, e.g. the base encoded stream is generated by an independent base codec that uses a different encoding approach to the enhancement streams.

Certain methods and encoder components as described herein may be performed by instructions that are stored upon a non-transitory computer readable medium. The non-transitory computer readable medium stores code comprising instructions that, if executed by one or more computers, would cause the computer to perform steps of methods or execute operations of encoder components as described herein. The non-transitory computer readable medium may comprise one or more of a rotating magnetic disk, a rotating optical disk, a flash random access memory (RAM) chip, and other mechanically moving or solid-state storage media. Some examples may be implemented as: physical devices such as semiconductor chips; hardware description language representations of the logical or functional behaviour of such devices; and one or more non-transitory computer readable media arranged to store such hardware description language representations. Descriptions herein reciting principles, aspects, and embodiments encompass both structural and functional equivalents thereof.

Certain examples have been described herein and it will be noted that different combinations of different components from different examples may be possible. Salient features are presented to better explain examples; however, it is clear that certain features may be added, modified and/or omitted without modifying the functional aspects of these examples as described. Elements described herein as "coupled" or "communicatively coupled" have an effectual relationship realizable by a direct connection or indirect connection, which uses one or more other intervening elements. Examples described herein as "communicating" or "in communication with" another device, module, or elements include any form of communication or link. Furthermore, equivalents and modifications not described above may also be employed without departing from the scope of the invention, which is defined in the accompanying claims.

The invention claimed is:

1. A method of encoding an input video as a hybrid video stream, the method comprising:
    receiving the input video at a first resolution;
    obtaining an indication of a desired quality level for the encoding, the desired quality level setting one or more bit rates for the hybrid video stream, said hybrid stream comprising a base encoded stream and a plurality of enhancement streams, the plurality of enhancement streams comprising a first enhancement stream and a second enhancement stream;
    downsampling the input video to produce downsampled video;
    obtaining the base encoded stream which is an encoding of the downsampled video;
    comparing a decoding of the base encoded stream with the downsampled video to produce a first set of residuals;
    applying the first set of residuals to the decoded base encoded stream to produce a corrected base video stream;
    upsampling the corrected base video stream;
    comparing the upsampled corrected base video stream with the input video to produce second set of residuals;
    encoding each of the plurality of enhancement streams by:
        determining quantisation parameters for the first and second sets of residuals based on the desired quality level;
        quantising the first and second sets of residuals based on the quantisation parameters; and
        creating an encoded stream from the set of quantised residuals.

2. The method of claim 1, wherein the base encoded stream and at least one of the plurality of enhancement streams are encoded using different levels of quantisation.

3. The method of claim 1, wherein the base encoded stream and one or more of the plurality of enhancement streams are encoded using encoding components that are controlled independently.

4. The method of claim 1, comprising:
    providing an encoding of the downsampled video to a first base encoder to create the base encoded stream.

5. The method of claim 1, wherein the encoding of each of the plurality of enhancement streams is performed on a frame-by-frame basis and comprises, for each frame and for each of the enhancement streams:
    reconstructing a frame of video at the respective resolution of the enhancement stream;
    comparing the reconstructed frame of video to a frame derived from the input video at the respective resolution of the enhancement stream; and
    generating the first and second set of residuals for the frame of video based on the comparison.

6. The method of claim 1, wherein determining quantisation parameters comprises:

receiving a status of a buffer that receives one or more of the plurality of encoded streams and the base encoded stream; and using the status to determine the quantisation parameters.

7. The method of claim 1, wherein determining quantisation parameters comprises:

determining a capacity of the buffer, based on the size of the buffer and the amount of data stored in the buffer, wherein the quantisation parameters are determined based on the desired level of quality and the determined capacity of the buffer.

8. The method of claim 7, wherein determining quantisation parameters for the first and second set of residuals for a given enhancement stream comprises:

determining an amount of data required to encode the first and second set of residual data for the given enhancement stream;

comparing the determined amount of data to the determined capacity of the buffer; and adjusting an initial set of quantisation parameters based on the comparison.

9. The method of claim 7, comprising:

comparing an estimated size of the set of quantised residuals with the capacity of the buffer;

responsive to the comparison, varying the step width for quantisation to increase or decrease the estimated size of the set of quantised residuals.

10. The method of claim 6, wherein the buffer is configured to receive inputs from the base encoded stream and the plurality of enhancement streams at variable bit rates and to provide an output at a constant bit rate.

11. The method of claim 1, wherein determining quantisation parameters for the first and second set of residuals for based on the desired quality level comprises:

determining quantisation parameters that provide the desired quality level within a set of bit rate constraints.

12. The method of claim 1, wherein determining quantisation parameters for the first and second set of residuals based on the desired quality level comprises, for each of the plurality of enhancement levels:

determining a step width for the quantising of the set of residuals.

13. The method of claim 1, wherein determining quantisation parameters for the first and second set of residuals comprises:

receiving an initial set of quantisation parameters for a set of residuals associated with a previous frame of video;

receiving an input from a buffer for the hybrid video stream;

receiving an input from a base encoder used to encode the base encoded stream; and adjusting the initial set of quantisation parameters based on the inputs to determine a set of quantisation parameters for a set of residuals associated with a current frame of video.

14. The method of claim 1 whereby the step of determining quantisation parameters comprises:

receiving a status of a base encoder used to encode the base encoded stream; and using the status to determine the quantisation parameters.

15. The method of claim 1, wherein the quantisation parameters for a given enhancement stream are based on a previous set of quantisation parameters for the enhancement stream.

16. The method of claim 1, wherein a plurality of frames of the input video are encoded and the quantisation parameters are determined for each of the plurality of frames on a frame-by-frame basis.

17. The method claim 16, wherein the determined quantisation parameters for a frame of data are used as initial quantisation parameters for the subsequent frame of video data.

18. The method of claim 17, wherein the quantisation parameters for a frame are determined based on a target data size for the frame and a current data size for the frame, the current data size for the frame being determined using a previous set of quantisation parameters.

19. A system comprising an encoder configured to perform the method of claim 1.

* * * * *